United States Patent
Tsukada et al.

(10) Patent No.: US 6,865,953 B2
(45) Date of Patent: Mar. 15, 2005

(54) FORCE SENSORS

(75) Inventors: Kouji Tsukada, Seto (JP); Jiro Sakata, Nagoya (JP); Kentaro Mizuno, Nisshin (JP); Yoshiteru Omura, Seto (JP); Yumi Masuoka, Aichi-gun (JP); Shoji Hashimoto, Seto (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 10/387,461

(22) Filed: Mar. 14, 2003

(65) Prior Publication Data

US 2003/0177839 A1 Sep. 25, 2003

(30) Foreign Application Priority Data

Mar. 22, 2002 (JP) ........................................ 2002-081892
Sep. 4, 2002 (JP) ........................................ 2002-259221

(51) Int. Cl.[7] .............................. G01B 7/16; H01L 41/04
(52) U.S. Cl. .......................................... 73/777; 310/311
(58) Field of Search .......................... 73/777, 774, 721, 73/727; 310/311

(56) References Cited

U.S. PATENT DOCUMENTS

| | | | | |
|---|---|---|---|---|
| 3,088,323 A | * | 5/1963 | Welkowitz et al. ............ 73/727 |
| 4,419,598 A | * | 12/1983 | Spitz et al. .................. 310/311 |
| 4,556,814 A | * | 12/1985 | Ito et al. ........................ 73/644 |
| 4,701,660 A | * | 10/1987 | Baumgartner et al. ......... 73/774 |
| 5,315,875 A | * | 5/1994 | Benedikt et al. ............... 73/706 |
| 5,760,675 A | * | 6/1998 | Lee et al. ........................ 338/2 |
| 5,773,728 A | | 6/1998 | Tsukada et al. |
| 5,869,766 A | * | 2/1999 | Cucci et al. .................... 73/706 |
| 5,939,817 A | * | 8/1999 | Takado ......................... 310/348 |
| 6,091,022 A | * | 7/2000 | Bodin ........................ 174/52.5 |

FOREIGN PATENT DOCUMENTS

| | | |
|---|---|---|
| JP | 63-177030 | 7/1988 |
| JP | 4-290937 | 10/1992 |
| JP | 5-1962 | 1/1993 |
| JP | 2002-50771 | 2/2002 |

* cited by examiner

*Primary Examiner*—Edward Lefkowitz
*Assistant Examiner*—Lilybett Martir
(74) *Attorney, Agent, or Firm*—Oblon, Spivak, McClelland, Maier & Neustadt, P.C.

(57) ABSTRACT

A pressure sensor has a housing having a first block and a second block provided therein. A force to be measured applies upon a upper face of the first block. An upper face of the second block makes contact with a base face of the first block. Piezoresistive elements are formed within the base face of the first block. The resistance values of these piezoresistive elements change as contacting pressure between the first block and the second block changes. A first electrode is formed on an upper face of the first block. A second electrode is formed on a base face of the second block. Electrical characteristics between the first electrode and the second electrode change following change in the contacting pressure between the first block and the second block.

19 Claims, 21 Drawing Sheets

FORCE SENSORS

CROSS-REFERENCE

This application claims priority to Japanese patent application serial numbers 2002-081892, 2002-259221, the contents of which are hereby incorporated by reference as if fully set forth herein.

BACKGROUND OF THE INVENTION

1. Field of the Invention

The present invention relates to force sensors. The force sensors of the invention are also capable of monitoring force generated by pressure. The force sensors can also be used as pressure sensors.

2. Description of the Related Art

FIG. 20 shows a cross-section of a conventional pressure sensor 1. FIG. 21 shows a cross-section along the line XXI—XXI of FIG. 20. FIG. 22 shows an electric circuit realized by using the pressure sensor 1. As shown in FIG. 20, the pressure sensor 1 has a structural body 21. The structural body 21 has a force transfer block 40 and a sensor block 30. As shown in FIG. 21, a surface of the sensor block 30 has four resistive elements 32a–32d. Adjoining resistive elements are mutually connected. For example, ends of the resistive elements 32a and 32b mutually connect. Four electrodes 34a–34d are formed on the surface of the sensor block 30. Each electrode 34a–34d connects with a connecting member of each adjoining resistive element. For example, the electrode 34b is connected with the connecting members of the resistive elements 32a and 32b. The four electrodes 34a–34d are connected with terminals 12a–12d respectively via wires 16a–16d. As shown in FIG. 20, the four terminals 12a–12d lead to the exterior of the pressure sensor 1. The force transfer block 40 covers the four resistive elements 32a–32d. As shown in FIG. 22, the four resistive elements 32a–32d form a full-bridge electric circuit.

The greater the force operated upon the pair of resistive elements 32b and 32d, the greater the change in the resistance values thereof. By contrast, the resistance values of the pair of resistive elements 32a and 32c hardly change when greater force is operated thereon. In this specification, the resistive elements 32b and 32d, wherein resistance values change in accordance with a greater force being operated thereon, are called piezoresistive elements. Of the four resistive elements comprising the full-bridge electric circuit, the pair of resistive elements 32b and 32d are piezoresistive elements. Consequently, when a force pushing the force transfer block 40 against the surface of the sensor block 30 changes, the balance of the full-bridge electric circuit changes. As shown in FIG. 22, in a state whereby a constant current flows between the electrodes 34d and 34b, the magnitude of the force operated upon the force transfer block 40 can be measured by measuring an electric potential V1 of the electrode 34c or an electric potential V2 of the electrode 34a.

SUMMARY OF THE INVENTION

In the conventional force sensor shown in FIG. 21, the electrodes 34 and the terminals 12 are connected via the wires 16. Below, reference numbers refer to common members and common events when letters a, b, etc. appended thereto are omitted. The structure of the conventional sensor is such that connecting the wires is a problematic operation. Moreover, the connection of the wires is unreliable, this connection easily deteriorating over an extended period of use.

One object of the present teaching is to realize a force sensor capable of being manufactured easily.

A further object of the present teaching is to realize a reliable force sensor.

One representative aspect of the force sensor of the present teaching has a pair of stacked blocks comprising a first block and a second block. The first block has first and second faces and the first face receives a force to be measured. The second block has third and fourth faces, and the third face of the second block contacts with the second face of the first block. At least one piezoresistive element is formed on one of the second face of the first block and the third face of the second block. Resistance value of the piezoresistive element changes as contacting pressure between the first block and the second block changes. A first electrode is formed on a face other than the fourth face of the second block. For instance, the first electrode may be formed on one of the first face of the first block, the second face of the first block, and the third face of the second block. A second electrode is formed on the fourth face of the second block. Electrical characteristics between the first electrode and the second electrode change in accordance with the change in the contacting pressure between the first block and the second block.

According to the above aspect, changes in the electric resistance of the piezoresistive element can be monitored by connecting the first electrode and the second electrode with the exterior of the sensor, typically by utilizing terminals. Not all of the four electrodes 34a–34d need to be connected with the four terminals 12a–12d as in the conventional pressure sensor 1 shown in FIG. 21. Further, in the above aspect, the second electrode is formed on the fourth face of the second block. The first electrode is formed on a face other than the fourth face of the second block. Accordingly, the conductors (typically terminals) leading to the electrodes and the exterior of the sensor have a greater degree of connective freedom compared to the case where the four electrodes 34a–34d are formed on a single face as in the conventional pressure sensor 1 shown in FIG. 21.

According to the above aspect, a reliable force sensor can be manufactured simply or easily.

DETAILED DESCRIPTION OF THE PREFERRED EMBODIMENTS

Figure 1:
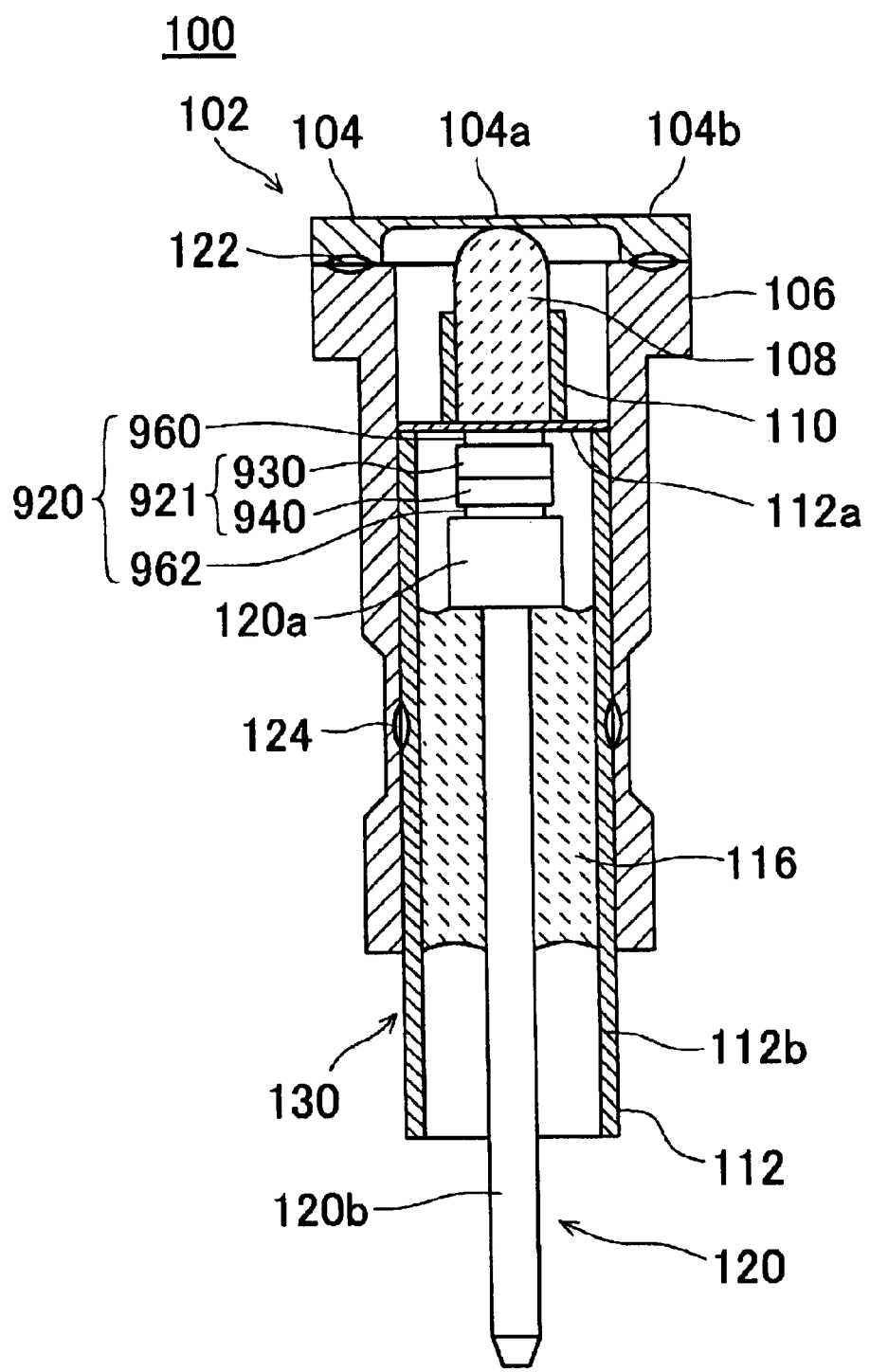
FIG. 1 shows a cross-sectional view of a pressure sensor of a first embodiment.

In a preferred aspect of an embodiment of a sensor of the present teaching, the sensor has a first block (930, 312, 323, 362, 382) and a second block (940, 302, 352) provided within a housing. The first block and the second block make face-to-face contact. At least one piezoresistive element (932b, 932d, 320b, 370b, 370d) is formed on a contacting face of the first block or the second block. When contacting pressure between the first block and the second block changes, resistance value of the piezoresistive element changes. A second electrode (962, 314, 364) is formed on an exposed surface (a face not making contact with the first block) of the second block. A first electrode (960, 322a, 372a, 319) is formed on a face differing from the face having the second electrode formed thereon.

At least one piezoresistive element intervenes between the first electrode and the second electrode. When the contacting pressure between the first block and second block changes, electrical characteristics between the first electrode and the second electrode change. By observing the changes in the electrical characteristics between the first electrode and the second electrode, the changes in the contacting pressure between the first block and second block can be monitored.

It is preferred that the first electrode is connected with a first terminal leading to the exterior of the sensor. It is also preferred that the second electrode is connected with a second terminal leading to the exterior of the sensor. The term 'connected' includes a situation where the first terminal and the first electrode make contact directly. The term 'connected' also includes a situation where the first terminal and the first electrode make contact via conductive materials (conductive adhesive, conductive low melting-point metal, conductive wire, etc). The same applies for the term 'connected' with regard to the second terminal and the second electrode.

It is preferred that the first electrode and the first terminal and/or the second electrode and the second terminal are not connected via a wire. Such an arrangement can reduce or eliminate problems associated with forming a connection using a wire. For example, the above aspect greatly reduces the likelihood that a connection between the electrode and the terminal will be broken due to age-related deterioration, impact, temperature rise, etc. Further, the manufacturing process of the sensor (the process of connecting the electrodes and the terminals) is simpler.

It is preferred that the first electrode and the first terminal and/or the second electrode and the second terminal are connected face-to-face. As a result, a sensor can be realized that is more reliable. A sensor can be realized that is more easily manufactured.

It is preferred that the first terminal and/or the second terminal is fixed to the housing. This increases the reliability of the sensor.

It is preferred that the sensor has the force transfer member (108), and that the sensor has the external-force receiving member (104a). When external force is operated on the external-force receiving member (104a), this force is preferably transferred to the first block via the force transfer member, the first block pressing against the second block.

It is preferred that the first terminal (112) connected with the first electrode has a first member (112a) located between the force transfer member and the first block, and that this first member (112a) moves following the movement of the force transfer member. Accordingly, the existence of the first member does not obstruct the movement of the external-force receiving member or the force transfer member. It is preferred that the first member (112a) is plate-like shaped.

It is preferred that the first terminal has a second member (112b) located within the housing. The second member (112b) is preferably a cylindrical-shaped member extending approximately parallel to the axial direction of the housing. The first member is preferably connected, in a manner allowing movement, to an end of the second member.

It is preferred that the second member (112b) is electrically connected to the housing. This arrangement allows the first terminal to be earthed via the housing. A second member (212b) may be electrically insulated from the housing.

It is preferred that a second terminal (120) extends in a bar shape, an end face of a bar-shaped member (120a) thereof making face-to-face contact with the second electrode. Accordingly, the second terminal can be located in a space facing the second electrode, and the sensor can be miniaturized.

It is preferred that space between the housing and the bar-shaped member of the second terminal is sealed. Accordingly, gas or liquid can be prevented from entering into sides of the block from the space between the second terminal and the housing. A more reliable sensor can thus be realized.

It is preferred that the first block and the second block are joined by an anode junction. This arrangement furnishes a more reliable sensor. It is preferred that either the first block or the second block contains silicon, and that the other corresponding block contains glass. The silicon and glass are preferably joined by an anode junction, thereby connecting the first block and the second block.

It is preferred that the at least one piezoresistive element is formed on the second face of the first block, the second block forming a semiconductor, an electric circuit being formed within this semiconductor region. This arrangement results in a more useful pressure sensor being realized. In this case, it is preferred that the electric circuit has a conductive member (for example, the current supply (974)) conducting electricity to the piezoresistive elements. Accordingly, even though the piezoresistive elements form a full-bridge electric circuit, only two electrodes need to be connected with the exterior of the sensor.

It is preferred that one end of the piezoresistive element (320b, 370b, 370d) is connected with the first electrode, another end of the piezoresistive element (320b, 370b, 370d) being connected with the second electrode. Accordingly, a single gauge electric circuit is formed between the first electrode and the second electrode.

A plurality of piezoresistive elements (370b, 370d) may be used. It is preferred that one end of each piezoresistive element is connected with the one common first electrode (372a), and the other end of each piezoresistive element is connected with the one common second electrode (364). This configuration is equivalent to a single gauge electric circuit. According to the above aspect, resistance can be reduced while sensitivity is virtually unchanged.

The piezoresistive element(s) is(are) not restricted to forming a single gauge electric circuit; they may well form a full-bridge electric circuit, or a half-bridge electric circuit. Temperature compensation effects can be obtained by employing the full-bridge electric circuit or the half-bridge electric circuit.

It is preferred that at least one of the first block or the second block has a conductor (may be a semiconductor doped with impurities) formed thereon; this provides at least part of a current path between the first electrode and the second electrode.

The first block can also be formed as an insulator. In that case, it is preferred that a conductive layer (322b) is formed on a portion of a surface face of the first block, this providing at least part of the current path between the first electrode and the second electrode.

It is preferred that the first electrode (322a) is connected with one end of the piezoresistive element (320b) via the conductive material (322b) formed along the surface face of the first block. A side face connecting the first face and second face of the first block preferably forms an obtuse angle relative to the third face of the second block. This arrangement allows the conductive material to be formed (e.g., deposited, etc.) more satisfactorily on the side face than in the case where this side face forms a right angle or an acute angle relative to the third face of the second block.

It is preferred that the piezoresistive element (320b) is formed on the third face of the second block that forms a semiconductor, this piezoresistive element (320b) and the regions (306, 318) surrounding the piezoresistive element being separated by a p-n junction. This allows the formation of the piezoresistive element utilizing a semiconductor while simultaneously preventing electrical leakage from this piezoresistive element. In this case, the formation of the electrode (308) is preferred, this connecting one end of the piezoresistive element (320b) with the region (318) surrounding the piezoresistive element. This arrangement allows one end of the piezoresistive element to be connected to the surrounding region while the piezoresistive element is simultaneously isolated from the surrounding region by the p-n junction.

The structural body is formed from the first block (930) and the second block (940). It is preferred that at least one (930) of the first block and the second block has the piezoresistive elements (932a–932d). A prescribed face of the structural body preferably consists of the first face of the first block, a face opposite this prescribed face of the structural body consisting of the fourth face of the second block.

It is preferred that the piezoresistive elements (932) are formed within a protruding section protruding from a face of one of the first block and the second block, this face opposing the other block. Accordingly, pressure originating from external force can be concentrated on the piezoresistive elements. This has the consequence that the electric resistance values of the piezoresistive elements change to a greater degree when a prescribed external force is operated. That is, the sensitivity of the sensor increases.

It is preferred that the protruding section encloses at least one quarter of the face of the first or second block that opposes the other block. It is even more preferred that this protruding section enclose at least one half of this face. The first or second block preferably has a protruding section (304) protruding from the face opposing the other block, this protruding section (304) being additional to the protruding section having the piezoresistive elements. As a result, the two blocks do not readily knock against one another even though the piezoresistive elements are formed within the protruding section. Consequently, a reliable sensor can be realized.

It is preferred that the region (316) of the second block, that makes contact with the second electrode (314), is a semiconductor region having a greater concentration of impurities than other regions. This arrangement allows a satisfactory ohmic contact to be established between the electrode and the semiconductor region in the case where the electrode contains metal.

It is preferred that, in order to monitor the change in the resistance of the piezoresistive elements, the only electrodes that need to be connected to the exterior of the sensor are the first electrode and the second electrode. It is even more preferred that the only electrodes that are actually connected to the exterior of the sensor are the first electrode and the second electrode. Below, several representative embodiments will be introduced.

First Representative Embodiment

FIG. 1 shows a cross-sectional view of a pressure sensor 100 of the first embodiment. The pressure sensor 100 has a housing 102, a force transfer member 108, a guide 110, and a sensor unit 130. The upper side in FIG. 1 is defined as the 'anterior end.' The lower side in FIG. 1 is defined as the 'posterior end.' Furthermore, an anterior-facing face of each member is defined as the 'anterior end face.' A posterior-facing face thereof is defined as the 'posterior end face.' Moreover, the up-down direction in FIG. 1 is the axial direction of the housing 102. The left-right direction in FIG. 1 is the width-wise direction of the housing 102.

The housing 102 has a housing anterior end member 104 and a housing cylindrical member 106. The housing anterior end member 104 and the housing cylindrical member 106 are welded together at a welding location 122. The housing anterior end member 104 has a diaphragm 104a and a diaphragm supporting member 104b. The diaphragm 104a is an example of a force-receiving member. A force-receiving member receives the pressure to be monitored. The force-receiving member is an example of an external-force receiving member. An anterior end face of the diaphragm 104a forms a force-receiving face. The diaphragm supporting member 104b supports an outer edge of the diaphragm 104a.

An anterior end of the force transfer member 108 is hemispherical in shape. An apex of the anterior end of the force transfer member 108 makes contact with a posterior end face of the diaphragm 104a. A posterior end face of the force transfer member 108 is a flat face. The guide 110 is cylindrical in shape, and the axial direction thereof is parallel to the axial direction of the housing 102. The guide 110 is fixed within the housing 102 (at a location not shown). A cavity portion of the guide 110 houses the force transfer member 108. By this means, the force transfer member 108 can move only in the axial direction of the housing 102. The posterior end face of the force transfer member 108 makes contact with an anterior end face of the sensor unit 130. This anterior end face is the anterior end face of a plate-shaped member 112a of a first terminal 112 (to be described).

The sensor unit 130 has a sensor member 920, the first terminal 112, and a second terminal 120. The sensor member 920 has a structural body 921, a first electrode 960, and a second electrode 962. The structural body 921 has a sensor block 930 and an electric circuit block 940. The sensor block 930 is an example of a first block. The electric circuit block 940 is an example of a second block. The first electrode 960 is formed on an anterior end face of the sensor block 930. The second electrode 962 is provided on a posterior end face of the electric circuit block 940. The sensor member 920 will be described in detail below. In the present embodiment, the first electrode 960 and the structural body 921 are formed separately. However, the first electrode 960 may be formed as part of the structural body 921. The same applies to the second electrode 962.

The first terminal 112 has the plate-shaped member 112a and a cylindrical member 112b. The plate-shaped member 112a is a thin disc-shaped plate that is shaped as a diaphragm and is capable of moving. The plate-shaped member 112a extends in the width-wise direction of the housing 102. The cylindrical member 112b is cylindrical in shape. The axial direction of the cylindrical member 112b is parallel to the axial direction of the housing 102. An outer edge of a posterior end face of the plate-shaped member 112a is spot-welded to an anterior end face of the cylindrical member 112b. The cylindrical member 112b of the first terminal 112 is press-fitted into the housing cylindrical member 106, and is welded thereto at a welding location 124. This press fitting and welding fix the cylindrical member 112b of the first terminal 112 to the housing cylindrical member 106. The second terminal 120 has a bar shape extending in the axial direction of the housing 102. The second terminal 120 has a large diameter bar-shaped member 120a and a small diameter bar-shaped member 120b.

The first electrode 960 connects face-to-face with the posterior end face of the plate-shaped member 112a of the first terminal 112. The second electrode 962 connects face-to-face with an anterior end face of the large diameter bar-shaped member 120a of the second terminal 120. The space between the second terminal 120 and the cylindrical member 112b of the first terminal 112 is sealed by glass solder 116. The cylindrical member 112b of the first terminal 112 is welded to the housing cylindrical member 106. Consequently, the second terminal 120 is fixed to the housing 102.

Figure 21:
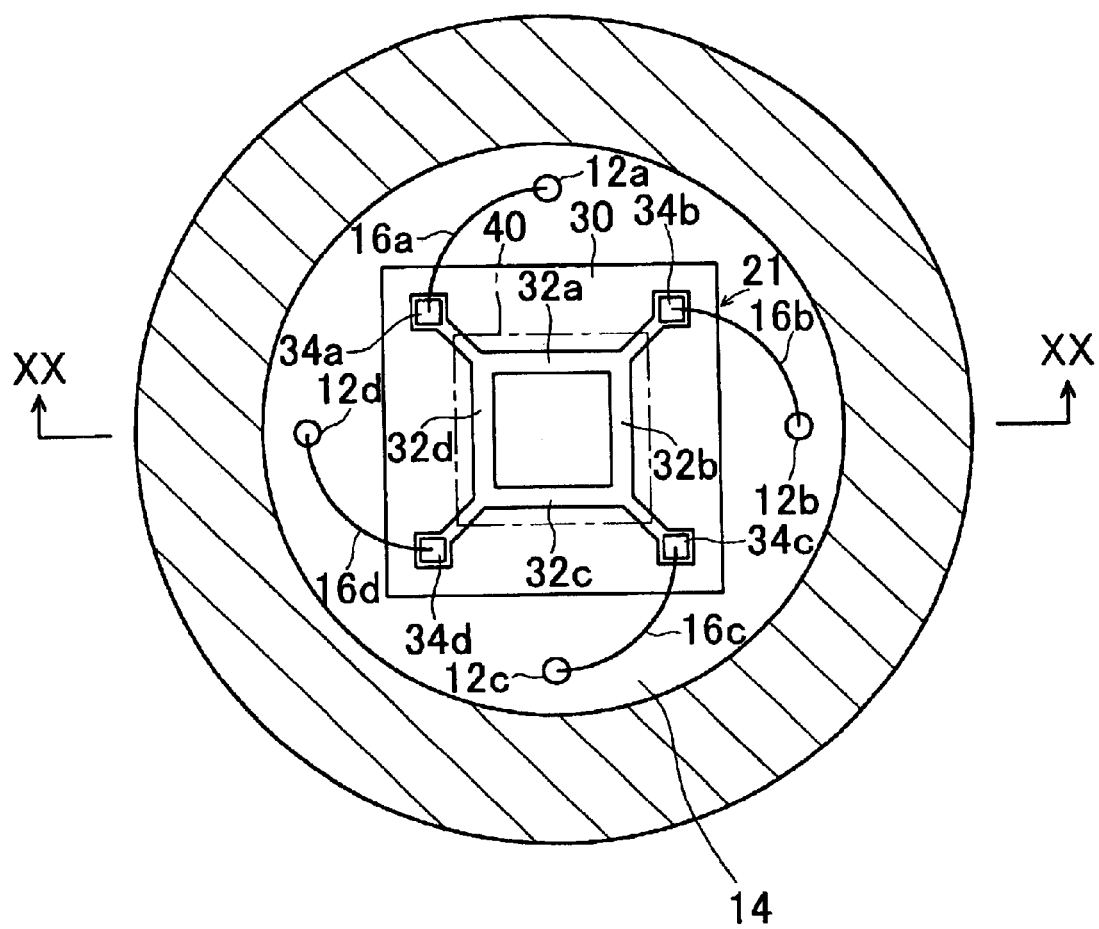
FIG. 21 shows a cross-sectional view of FIG. 20 along the line XXI—XXI.

In the conventional pressure sensor 1 shown in FIG. 21, the terminals 12a–12d are located at the exterior of the structural body 21 so as to surround it. By contrast, in the pressure sensor 100 of the first embodiment shown in FIG. 1, the second terminal 120 is located in a space to the posterior end of the second electrode 962. As a result, the space within the housing 102 is utilized effectively. In particular, the housing 102 can be reduced in size in the width-wise direction.

Figure 20:
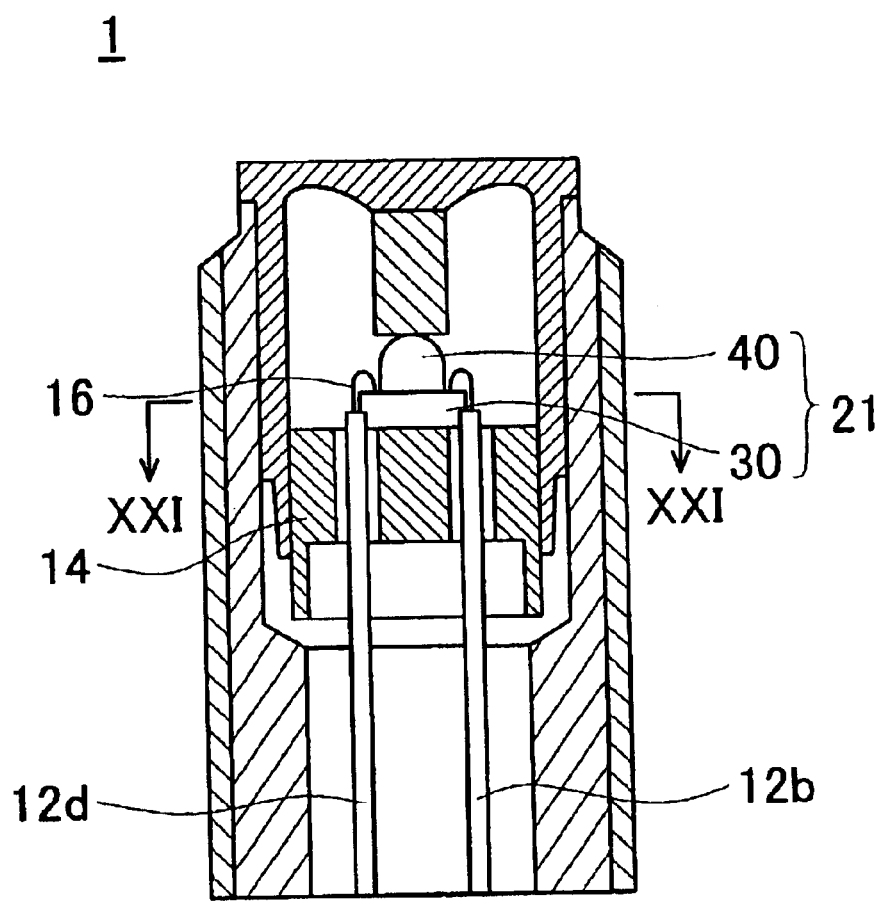
FIG. 20 shows a cross-sectional view of a conventional pressure sensor.

Moreover, in the pressure sensor 100 of the first embodiment, the second terminal 120 is fixed to the housing 102, allowing the sensor member 920 to be positioned above the second terminal 120. Consequently, a supporting base 14 like that of the conventional pressure sensor 1 shown in FIG. 20 is not required. The number of components of the pressure sensor can be reduced.

Figure 2:
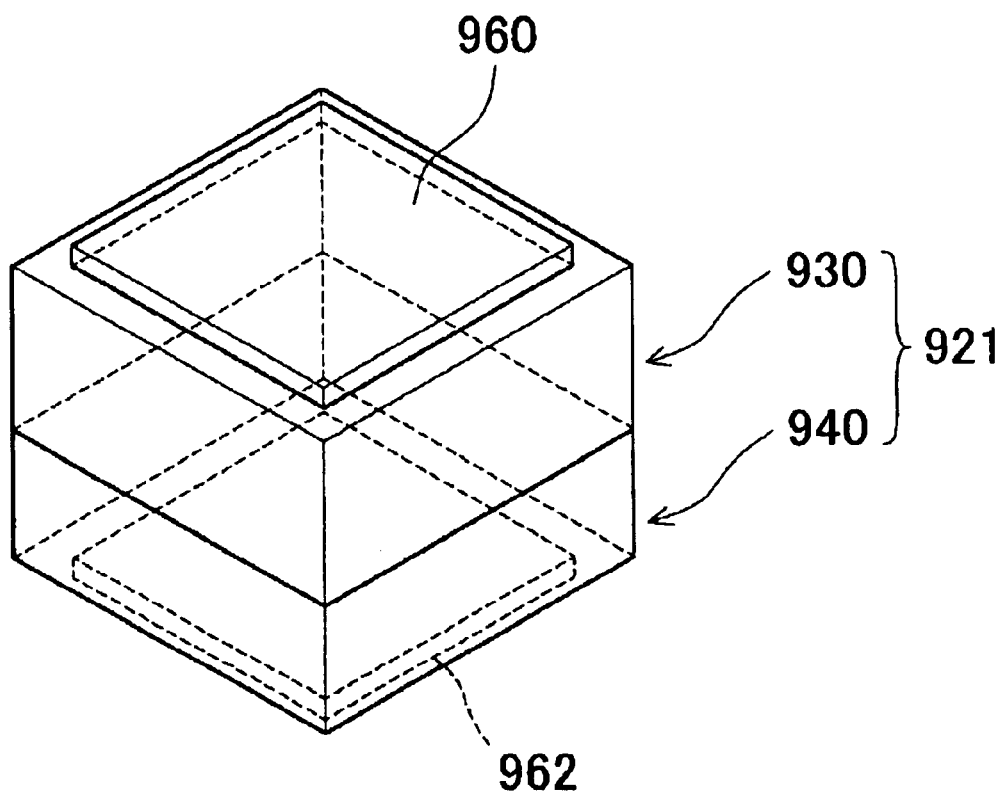
FIG. 2 shows a schematic diagonal view of a sensor member of the first embodiment.

The sensor member 920 will now be described in detail. As shown in the diagonal view of FIG. 2, the sensor member 920 has a block shape. The first electrode 960 is formed on the anterior end face (first face) of the sensor block 930 (the first block). The first electrode 960 has a flat plate shape. The second electrode 962 is formed on the posterior end face (fourth face) of the electric circuit block 940 (the second block). The second electrode 962 also has a flat plate shape. A posterior end face (second face) of the sensor block 930 (the first block), and an anterior end face (third face) of the electric circuit block 940 (the second block), make face-to-face contact and form an anode junction (to be described).

Figure 3:
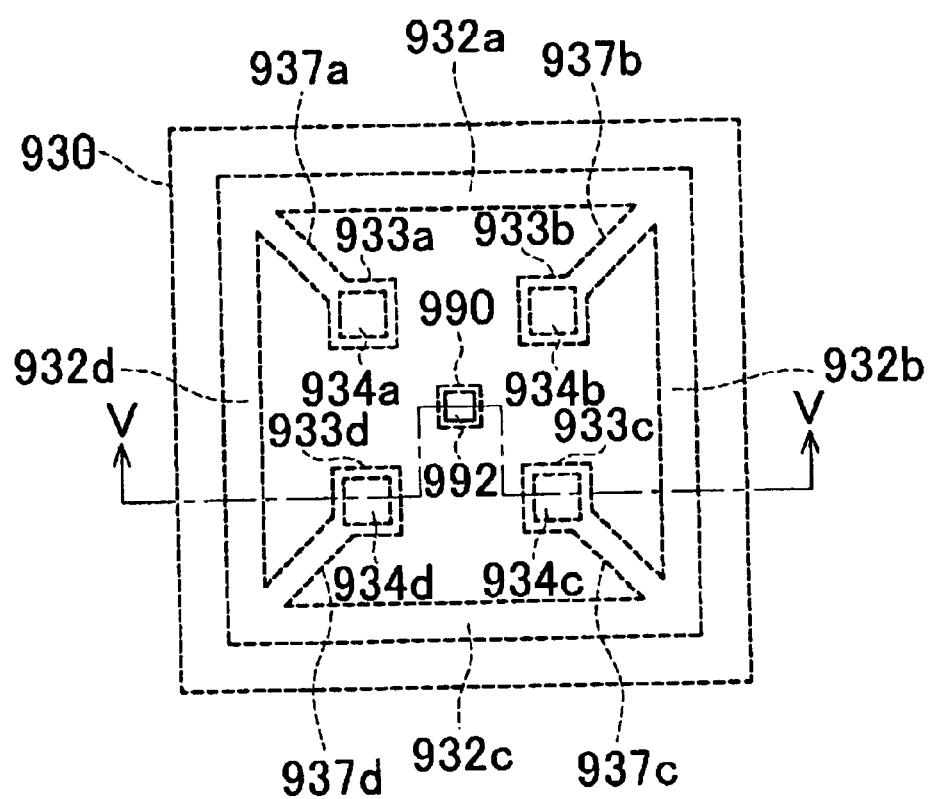
FIG. 3 shows the structure of a posterior end face of a sensor block of the first embodiment viewed from an anterior end of this sensor block towards a posterior end thereof.
Figure 4:
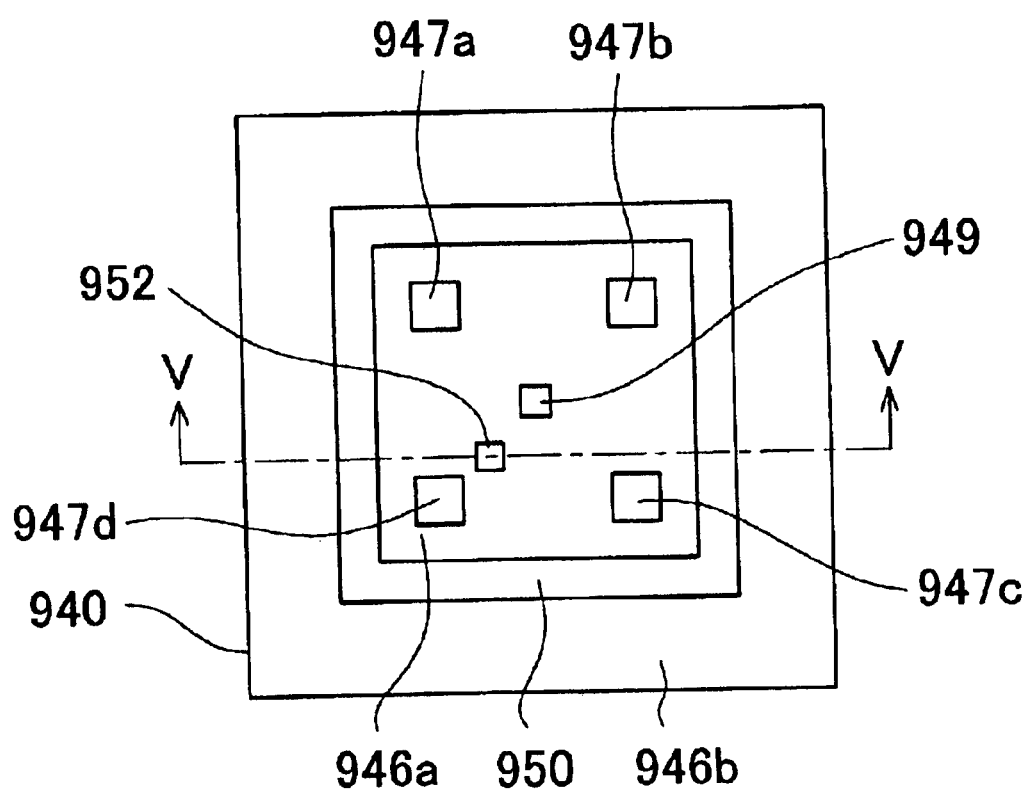
FIG. 4 shows the structure of an anterior end face of an electric circuit block of the first embodiment viewed from an anterior end of this electric circuit block towards a posterior end thereof.
Figure 5:
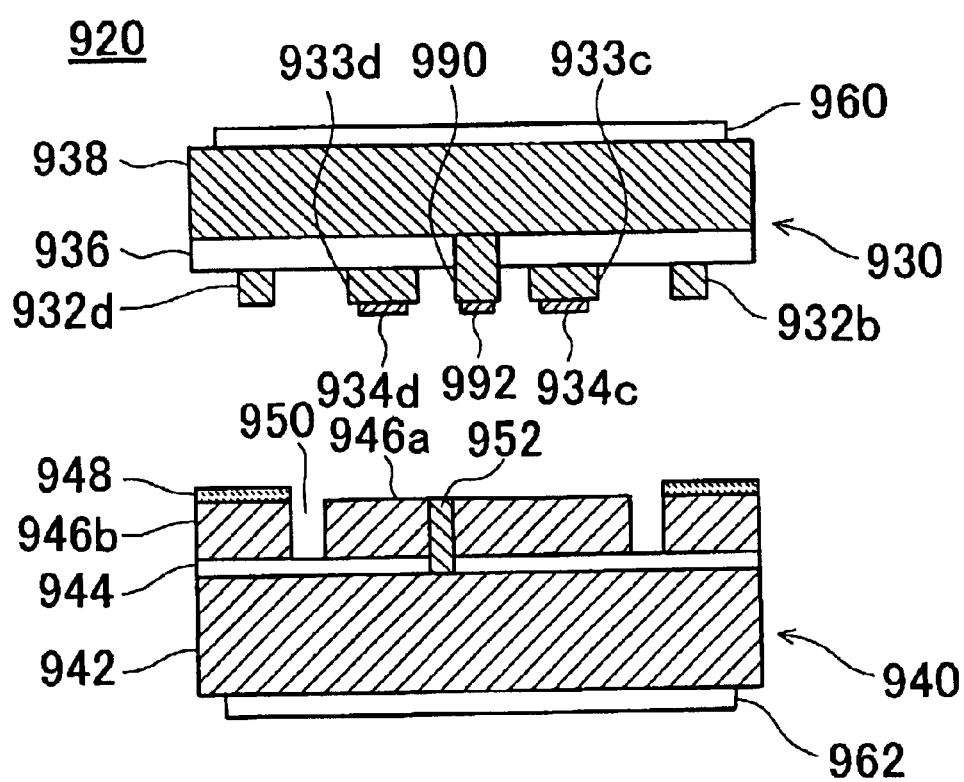
FIG. 5 shows a cross-sectional view of the sensor block of FIG. 3 along the line V—V, and a cross-sectional view of the electric circuit block of FIG. 4 along the line V—V.

FIG. 3 shows the structure of the posterior end face of the sensor block 930 viewed from an anterior end of this sensor block 930 towards the posterior end thereof. The posterior end face is an inner face and is shown by a dotted line. FIG. 4 shows the structure of the anterior end face of the electric circuit block 940 viewed from the anterior end of this electric circuit block 940 towards the posterior end thereof. FIG. 5 shows a cross-sectional view of the sensor block 930 of FIG. 3 along the line V—V, and a cross-sectional view of the electric circuit block 940 of FIG. 4 along the line V—V.

The sensor block 930 is formed using an SOI (Silicon On Insulator) substrate. As shown in FIG. 5, the SOI substrate has a silicon substrate 938, a silicon oxide zone 936, and a silicon active zone. The silicon active zone is located bellow the silicon oxide zone 936. Since impurities are introduced therein, the silicon substrate 938 exhibits low resistance. As shown in FIGS. 3 and 5, the silicon active zone has four resistive elements 932a–932d, four connecting members 937a–937d, four connectors 933a–933d, and one conductor 990. The resistive elements 932a–932d function as a gauge. The gauge could also be termed distortion gauge or semiconductor gauge. Since impurities are introduced into the silicon active zone, low resistance is exhibited in the above locations.

Electrodes 934a–934d are formed on exposed faces of each corresponding connector 933a–933d. As shown in FIG. 5, a portion of the silicon oxide zone 936 is removed and the contact zone 990 is buried into the space formed by this removal. The contact zone 990 protrudes from a surface face of the silicon oxide zone 936. An outer face of this protruding contact zone 990 has the same height as the outer faces of the connectors 933. An electrode 992 is formed on the exposed face of the contact zone 990.

As shown in FIG. 3, the four resistive elements 932a–932d are formed in a square shape. The four resistive elements 932a–932d enclose at least half the area of the posterior end face of the sensor block 930. As illustrated by the resistive elements 932b and 932d of FIG. 5, the resistive elements 932a–932d protrude from the surface face of the silicon oxide zone 936. An exposed face of each resistor element 932a–932d is formed in a flat mesa shape.

The four electrodes 934a–934d are provided in the area enclosed by the square-shaped resistive elements 932a–932d. Accordingly, the sensor block 930 can be made smaller than in the case where the electrodes 934a–934d are outside the area enclosed by the resistive elements 932a–932d. As a result, the pressure sensor can be miniaturized. Each of the four corners of the square-shaped resistive elements 932a–932d is electrically connected with one of the respective four electrodes 934a–934d via the connecting members 937a–937d. The contact zone 990 is located in the center of the posterior end face of the sensor block 930.

The posterior end face of the sensor block 930 is a (110) face. The resistive elements 932b and 932d located in this (110) face are provided in the <110> direction. The resistive elements 932a and 932c are provided in the <100> direction. Each of the resistive elements 932a–932d is provided so as to conform to the piezoresistance coefficient $\pi_{13}'$. The piezoresistance coefficient $\pi_{13}'$ has the greatest sensitivity in the direction <110> of the (110) face, and has a sensitivity of zero in the direction <100>. As a result, the resistive elements 932b and 932d function as piezoresistive elements, their resistance changing according to the piezoresistive effect when compressive stress is operated. By contrast, the resistive elements 932a and 932c function as the baseline resistance, their resistance hardly changing when compressive stress is operated.

The electric circuit block 940 shown in FIG. 5 is also formed using an SOI substrate. The SOI substrate has a silicon substrate 942, a silicon oxide zone 944, and a silicon active zone. The silicon active zone is located above the silicon oxide zone 944. Since impurities are introduced therein, the silicon substrate 942 exhibits low resistance. The silicon active zone has a central active zone 946a and an outer active zone 946b. A space 950 is formed between the central active zone 946a and the outer active zone 946b. A space 950 reaches the silicon oxide zone 944. Consequently, the central active zone 946a and the outer active zone 946b are mutually insulated. Glass 948 containing floating ions is formed on the outer active zone 946b. One example of glass containing floating ions is Pyrex (Registered Trademark) glass.

A processing electric circuit (to be described) is formed in the central active zone 946a. The central active zone 946a is electrically connected to the first electrode 960 via the electrode 992, contact zone 990 and the silicon substrate 938. A portion of the silicon oxide zone 944 is removed at a location within a portion of the central active zone 946a and a contact zone 952 is being buried into the space formed by this removal. The contact zone 952 connects the central active zone 946a with the second electrode 963. The anterior end face of the electric circuit block 940 is a (100) face. A (100) face has the advantage that electric circuits can easily be integrated.

In FIG. 4, the processing electric circuit formed within the central active zone 946a is not shown. Electrodes 947a–947d, shown in FIG. 4, are connected with the electrodes 934a–934d of the sensor block 930 shown in FIG. 3. An electrode 949 shown in FIG. 4 is connected with the electrode 992 of the sensor block 930 shown in FIG. 3. As shown in FIG. 4, the contact zone 952 is also exposed to the surface face of the central active zone 946a.

The sensor block 930 and the electric circuit block 940, shown in FIG. 5, are joined firmly together by an anode junction. More specifically, the anode junction connects the resistive elements 932a–932d of the sensor block 930 and the glass 948 on the outer active zone 946b of the electric circuit block 940. The outer active zone 946b is insulated from the central active zone 946a. Consequently, the processing electric circuit in the central active zone 946a is not damaged in the case where the outer active zone 946b receives high voltage and gets connected by an anode junction to the sensor block 930.

Figure 6:
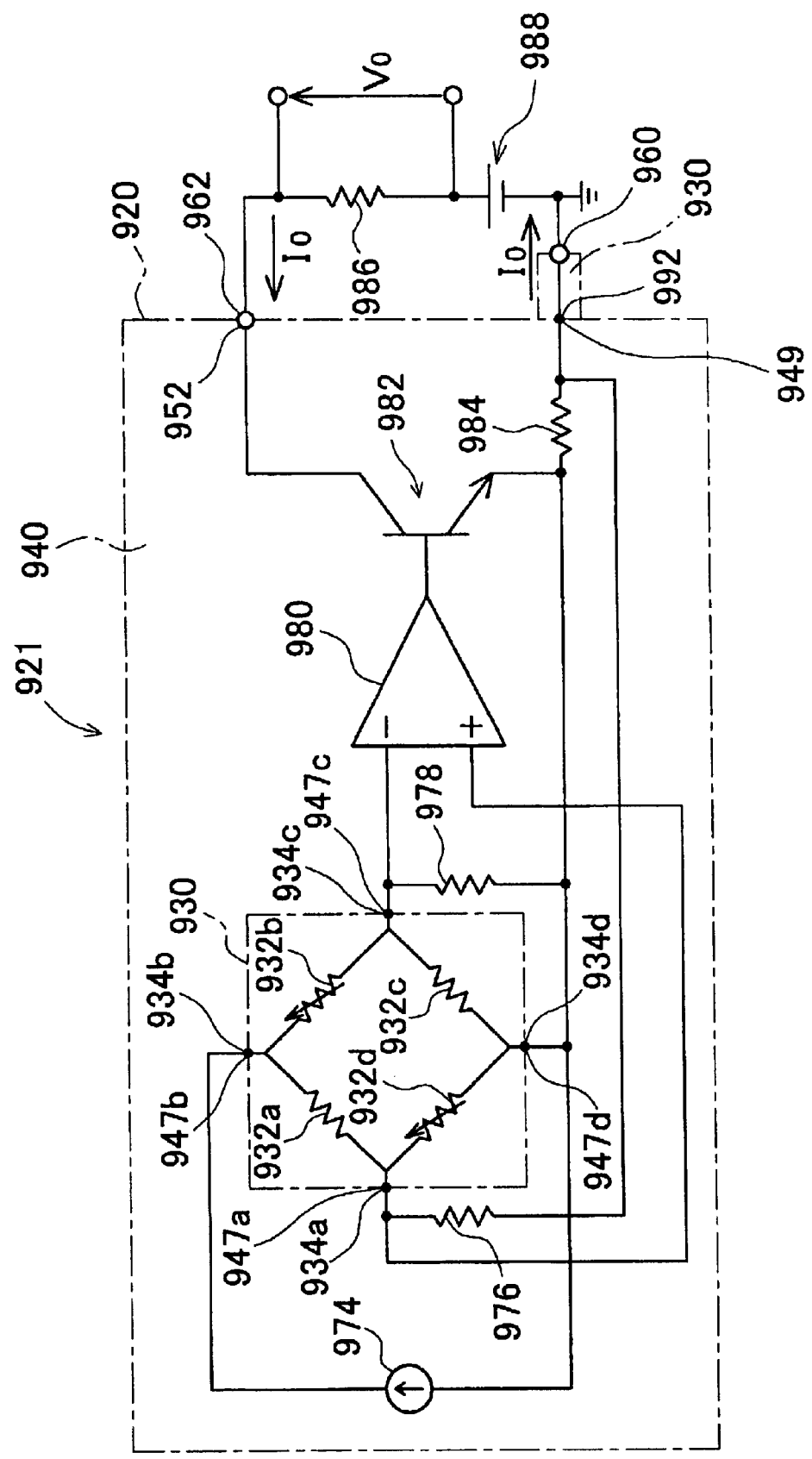
FIG. 6 shows an electric circuit realized by using the pressure sensor of the first embodiment.

FIG. 6 shows an electric circuit realized when the sensor block 930 and electric circuit block 940 is stacked and the pressure sensor 100 is in use. The resistive elements 932a–932d formed in the sensor block 930 constitute a full-bridge electric circuit. Of these resistive elements 932a–932d, the pair of resistive elements 932b and 932d are piezoresistive elements. The following are provided in the electric circuit block 940 (in the central active zone 946a): a current supply 974, an operational amplifier 980, a transistor 982, input resistors 976 and 978, and a feedback resistor 984. These elements constitute the processing electric circuit. The input electrodes 934b and 934d of the sensor block 930 are connected with the current supply 974 via the electrodes 947b and 947d. The output electrode 934a of the sensor block 930 is connected with a positive-phase-sequence input terminal of the operational amplifier 980 via the electrode 947a. The output electrode 934c of the sensor block 930 is connected with a negative-phase-sequence input terminal of the operational amplifier 980 via the electrode 947c.

An output terminal of the operational amplifier 980 is connected with a base terminal of the transistor 982. A collector terminal of the transistor 982 is connected with the second electrode 962 via the contact zone 952 and the silicon substrate 942. An emitter terminal of the transistor 982 is connected with the first electrode 960 via the feedback resistor 984, the electrode 949, the electrode 992, the contact zone 990, and the silicon substrate 938. One end of the feedback resistor 984 is connected with the first output electrode 934a via the first input resistor 976 and the electrode 947a. The other end of the feedback resistor 984 is connected with the second output electrode 934c via the second input resistor 978 and the electrode 947c.

The transistor 982 converts the output voltage of the operational amplifier 980 to a current Io. The current Io can be adjusted by changing the resistance values of the input resistors 976 and 978 and the feedback resistor 984. A monitoring resistor 986 and a voltage supply 988 are connected between the first electrode 960 and the second electrode 962. The monitoring resistor 986 is used to monitor an output voltage Vo.

When the resistance of each piezoresistive elements 932b and 932d changes by ΔR, the current Io also changes by ΔIo. For example, assume that the voltage of the voltage supply 988 is 10V. When the change ΔR of the resistance is zero, the current Io is set to have the value 2 mA. When the change ΔR of the resistance is greatest, the current Io is set to have the value 4 mA. Assume that the value of the monitoring resistor 986 is 500Ω. If set at these conditions, a voltage Vo varying between 1–2 V appears at both ends of the resistor 986, depending on the pressure applied.

In the present embodiment, the resistive elements 932a–932d form a full-bridge electric circuit. In addition, the sensor block 930 has the four electrodes 934a–934d, whereas the electric circuit block 940 has the current supply 974. This current supply 974 is connected with the input electrodes 934b and 934d of the sensor block 930. Consequently, even though the resistive elements 932a–932d form a full-bridge electric circuit, the first electrode 960 and the second electrode 962 are the only electrodes among the electrodes provided in the structural body 921 that need to be connected with the exterior of the housing 102. The magnitude of change in the electric resistance of the piezoresistive elements 932b and 932d can be monitored by connecting the first electrode 960 with the first terminal 112 and connecting the second electrode 962 with the second terminal 120.

Further, according to the present embodiment, impedance, as observed from the exterior, can be reduced. Consequently, the influence of the external noise component can be reduced. Furthermore, changes in the resistance of the piezoresistive elements 932 can easily be converted to the desired change in the current Io.

The operation of the pressure sensor 100 of the first embodiment will now be described. When pressure is applied on the anterior end face (the force-receiving face) of the diaphragm 104a shown in FIG. 1, the diaphragm 104a bends towards the posterior. The force transfer member 108 makes contact with the posterior end face of the diaphragm 104a. Consequently, when the diaphragm 104a bends towards the posterior, the force transfer member 108 is guided into the guide 110 and is moved towards the posterior. The diaphragm-shaped plate-shaped member 112a of the first terminal 112 makes contact with the posterior end face of the force transfer member 108. When the force transfer member 108 moves towards the posterior, the plate-shaped member 112a of the first terminal 112 bends towards the posterior.

By this means, compressive stress is operated on the piezoresistive elements 932 protruding from the sensor block 930. The resistance values of the piezoresistive elements 932b and 932d increase as this compressive stress is exerted. However, the resistance values of the resistive elements 932a and 932c (baseline resistors) do not change.

In the case where no compressive stress is operated on the resistive elements 932 shown in FIG. 6, assume that the resistance of each of the resistive elements 932a–932d remains unchanged. In that case, a voltage $V_{934a}$ at the output electrode 934a is calculated as shown in (1) below. Here, I is the value of the current supplied between the input electrodes 934b and 934d from the current supply 974. $R_{932a}$, $R_{932d}$ are the resistance values of the resistive elements 932a and 932d respectively.

$$V_{934a} = (I/2) \times R_{932d}/(R_{932a}+R_{932d}) \quad (1)$$

If the resistance of the resistor element 932a does not change, and the resistance of the piezoresistive element 932d increases, the voltage $V_{934a}$ from the output electrode 934a increases.

A voltage $V_{934c}$ at the output electrode 934c is calculated as in (2) below. Here, $R_{932b}$, $R_{932c}$ are the resistance values of the resistive elements 932b and 932c respectively.

$$V_{934c} = (I/2) \times R_{932c}/(R_{932b}+R_{932c}) \quad (2)$$

If the resistance of the piezoresistive element 932b increases, and the resistance of the resistor element 932c does not change, the voltage $V_{934c}$ at the output electrode 934c decreases.

The output voltage $V_{934a}$ is inputted into the positive-phase-sequence input terminal of the operational amplifier 980. The output voltage $V_{934c}$ is inputted into the negative-phase-sequence input terminal of the operational amplifier 980. By this means, the operational amplifier 980 outputs the difference between the voltages $V_{934a}$ and $V_{934c}$. The magnitude of change in the resistance values of the piezoresistive elements 932b and 932d can be monitored from this difference between the voltages. Further, in the present embodiment, the transistor 982 converts the difference between the voltages to the current Io. When the current Io flows through the resistor 986, the voltage Vo at both ends of the resistor 986 can be measured by a voltmeter. By this means, the magnitude of change in the resistance values of the piezoresistive elements 932b and 932d can be monitored. From the magnitude of this change in the resistance, the magnitude of compressive stress operated upon the piezoresistive elements 932b and 932d can be monitored. From the magnitude of compressive stress, the magnitude of pressure applied on the anterior end face of the diaphragm 104a can be monitored.

The construction method (assembly method) of the pressure sensor 100 of the first embodiment will now be described with the reference to FIG. 1. First, the housing cylindrical member 106 is prepared, the guide 110 already having been formed therein. Then, the force transfer member 108 is press-fitted from its anterior end into the guide 110. Then, the housing anterior end member 104 is prepared. The housing anterior end member 104 is welded to the housing cylindrical member 106 at the welding location 122.

The sensor unit 130 is constructed separately from the above components. First, the cylindrical member 112b of the first terminal 112 is prepared. The bar-shaped second terminal 120 is inserted into the cylindrical member 112b of the first terminal 112. The bar-shaped second terminal 120 is positioned such that its axis is aligned in a virtually identical direction as the axis of the cylindrical member 112b of the first terminal 112. In this state, the space between the second terminal 120 and the cylindrical member 112b of the first terminal 112 is sealed by the glass solder 116. By this means, the second terminal 120 is fixed to the cylindrical member 112b of the first terminal 112.

Next, the sensor member 920 is prepared, the sensor member 920 being assembled prior to its being fitted with the pressure sensor 100. The second electrode 962 of the sensor member 920 is connected with the end face of the second terminal 120. Here, the term 'connected' includes situations where direct contact is made, and situations where contact is achieved by bonding via a conductive adhesive. Next, the plate-shaped member 112a of the first terminal 112 is prepared. One face of this plate-shaped member 112a is connected to the first electrode 960 of the sensor member 920. Then, an outer circumference portion of the plate-shaped member 112a of the first terminal 112 and an end portion of the cylindrical member 112b are welded together. The sensor unit 130 is constructed by means of the process described above.

Next, the sensor unit 130 is press-fitted into the housing cylindrical member 106. The anterior end (the plate-shaped member 112a of the first terminal 112) of the sensor unit 130 is press-fitted until it reaches a position whereby it makes contact with a posterior end of the guide 110. After this press fitting, the housing cylindrical member 106 and the sensor unit 130 are welded together at the welding location 124. This press fitting and welding fix the sensor unit 130 firmly to the housing cylindrical member 106. The pressure sensor 100 is constructed by means of the process described above.

The pressure sensor 100 may also be assembled in, for example, the following order. First, the sensor unit 130 is press-fitted into the housing cylindrical member 106. Next, the force transfer member 108 is inserted into the guide 110 of the housing cylindrical member 106. Next, the housing anterior end member 104 is welded to the housing cylindrical member 106.

The sensor unit 130 may also be assembled in, for example, the following order. First, the plate-shaped member 112a is welded to the cylindrical member 112b of the first terminal 112. Next, the first electrode 960 of the sensor member 920 is connected to the plate-shaped member 112a of the first terminal 112. Next, the second electrode 962 of the sensor member 920 is connected to the second terminal 120. Next, the space between the second terminal 120 and the cylindrical member 112b of the first terminal 112 is sealed by the glass solder 116.

Figure 22:
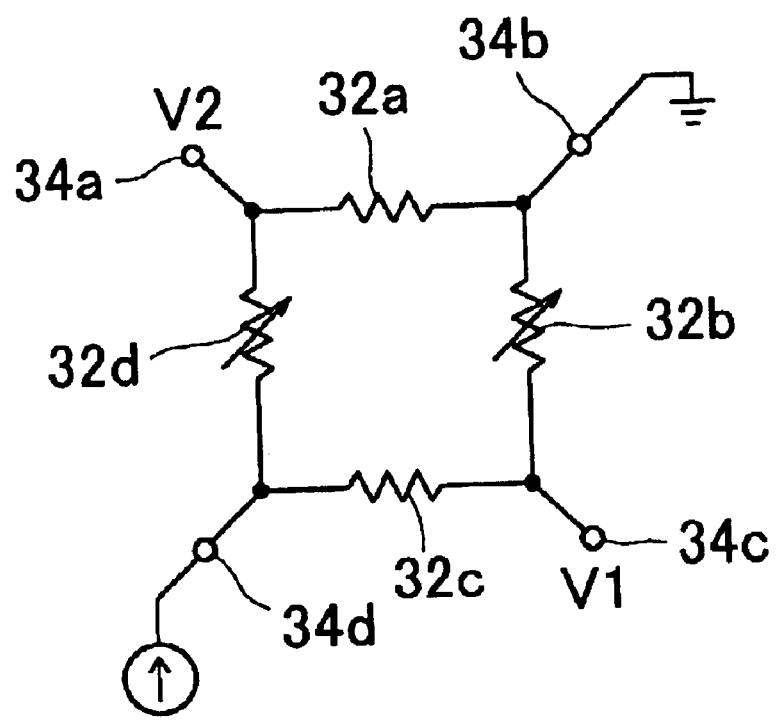
FIG. 22 shows an electric circuit realized by using the conventional pressure sensor.

Compared to the conventional pressure sensor 1 shown in FIGS. 20–22, the pressure sensor 100 of the first embodiment has the following operations and effects. The operation of connecting the electrodes and terminals can be performed easily. As a consequence, the manufacturing process of the sensor is easier. The configuration of the sensor is simpler. The sensor can be miniaturized. The sensor is more reliable.

In Japanese Laid-open Patent Publication No. 4-290937, a pressure sensor using piezoelectric elements is disclosed. However, in this pressure sensor using piezoelectric elements, it is difficult to monitor pressure when there is not much change in the pressure applied (static pressure). By contrast, a pressure sensor using piezoresistive elements, such as that of the first embodiment, is able to monitor static pressure. Thus, the pressure sensor 100 of the first embodiment yields useful effects that cannot be obtained from the pressure sensor using piezoelectric elements.

Second Representative Embodiment

Figure 7:
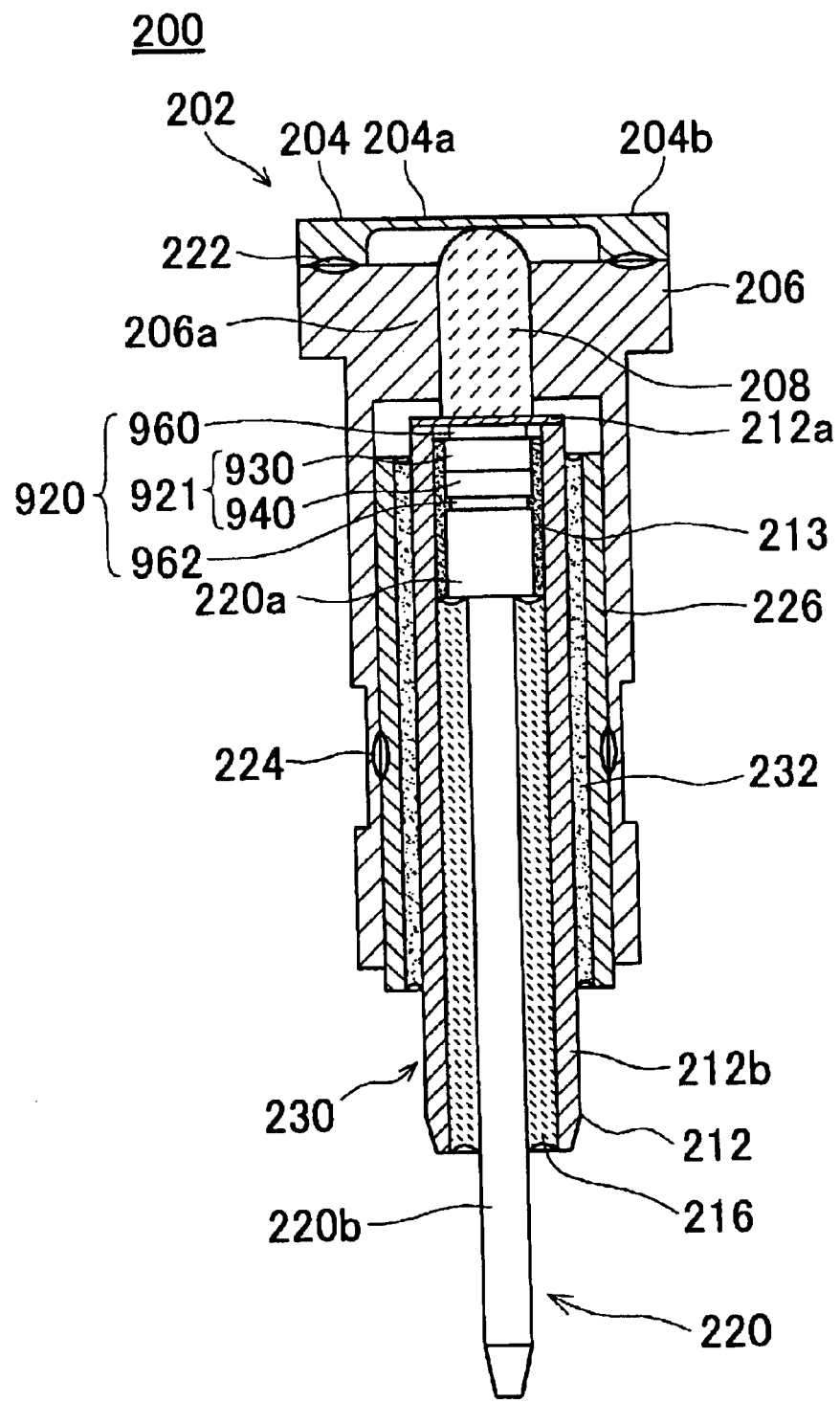
FIG. 7 shows a cross-sectional view of a pressure sensor of a second embodiment.

FIG. 7 shows a cross-sectional view of a pressure sensor 200 of a second embodiment. In this pressure sensor 200, an anterior end portion 206a of a housing cylindrical member 206 performs the same function as the guide 110 of the first embodiment. In the first embodiment, as shown in FIG. 1, the cylindrical member 112b of the first terminal 112 is press-fitted into the housing cylindrical member 106, then is welded therein at a welding location 124. By contrast, in the second embodiment, as shown in FIG. 7, a cylindrical member 212b of a first terminal 212 is neither press-fitted into the housing cylindrical member 206, nor is it welded therein. In the second embodiment, an outer cylindrical member 226 is press-fitted into the housing cylindrical member 206, and then it is welded therein at a welding location 224. By this means, the outer cylindrical member 226 is fixed to a housing 202.

The inside diameter of the outer cylindrical member 226 is greater than the outside diameter of the cylindrical member 212b of the first terminal 212. Space between the cylindrical member 212b of the first terminal 212 and the outer cylindrical member 226 is sealed by glass solder 232. By this means, the cylindrical member 212b of the first terminal 212 is fixed within the outer cylindrical member 226. As a result, the cylindrical member 212b of the first terminal 212 is fixed within the housing 202 via the outer cylindrical member 226. Furthermore, the housing 202 and the cylindrical member 212b of the first terminal 212 are mutually insulated. Further, an insulating pipe 213 is provided between the sensor member 920 and the cylindrical member 212b of the first terminal 212. This insulating pipe 213 is also provided between a large diameter bar-shaped member 220a of a second terminal 220 and the cylindrical member 212b of the first terminal 212. These are the chief points of difference from the first embodiment.

The construction method (assembly method) of the pressure sensor 200 of the second embodiment will now be described with reference to FIG. 7. First, a force transfer member 208 is inserted into a cavity of the anterior end portion 206a of the housing cylindrical member 206. Next, a housing anterior end member 204 and the housing cylindrical member 206 are welded together at a welding location 222. Next, the outer cylindrical member 226 is press-fitted from the posterior end into the housing cylindrical member 206. After that, the outer cylindrical member 226 and the housing cylindrical member 206 are welded together at the welding location 224. Then, a sensor unit 230 is constructed in the same manner as the sensor unit 130 of the first embodiment. After that, the sensor unit 230 is inserted into the outer cylindrical member 226. Next, space between the sensor unit 230 and the outer cylindrical member 226 is sealed by glass solder 216. The pressure sensor 200 is constructed (assembled) by means of the process described above.

Third Representative Embodiment

Figure 8:
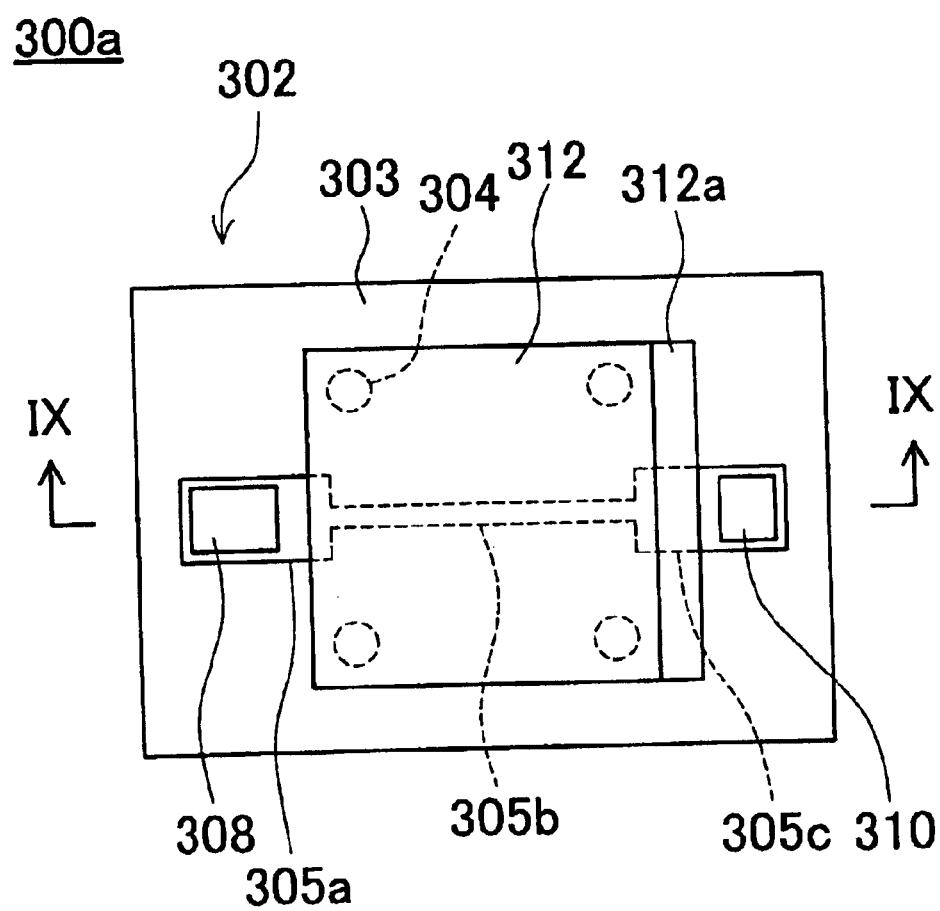
FIG. 8 shows a plan view of a sensor member of a third embodiment.
Figure 9:
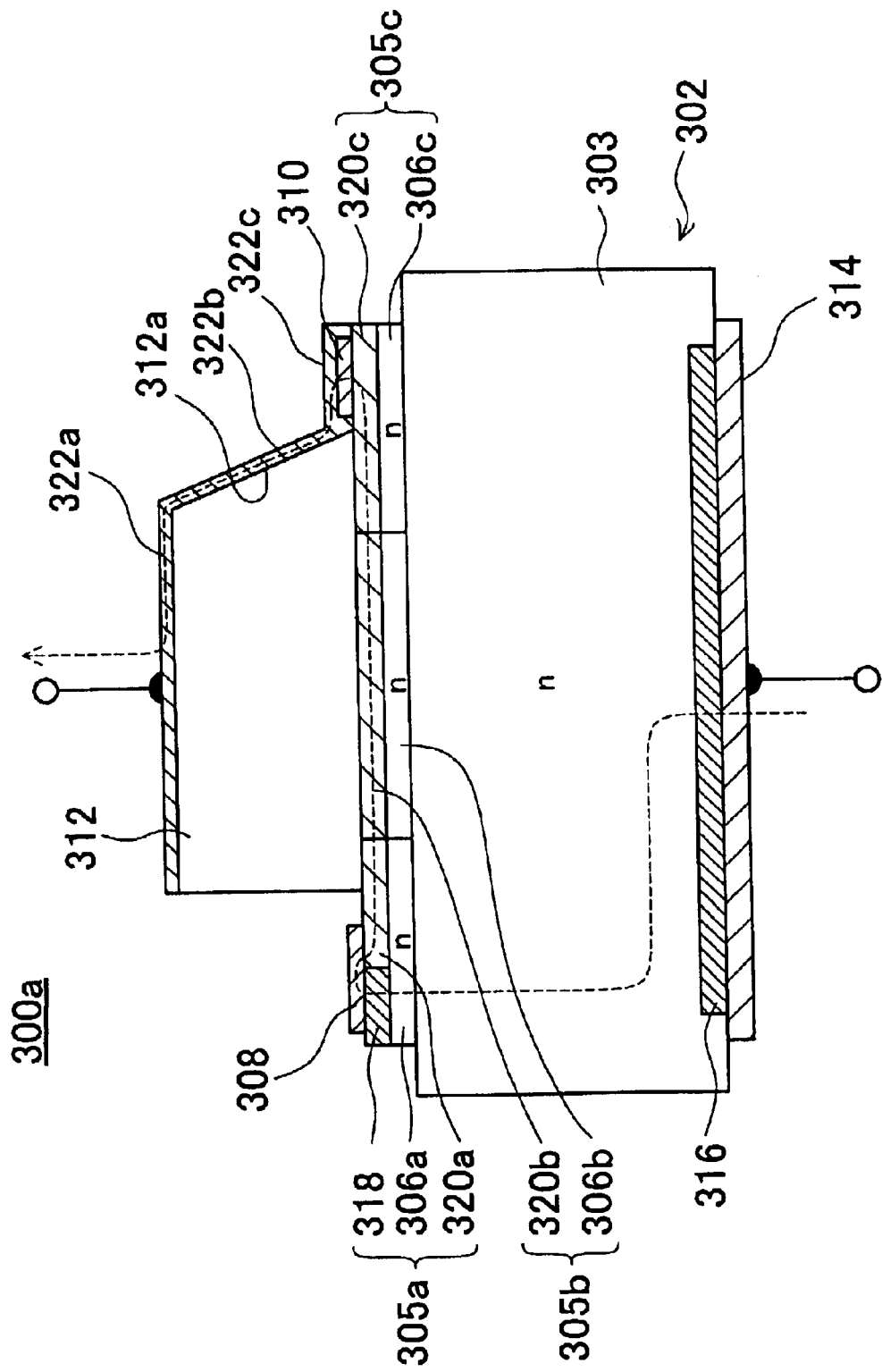
FIG. 9 shows a cross-sectional view of FIG. 8 along the line IX—IX.

The third embodiment incorporates a sensor member 300a, shown in FIGS. 8 and 9, into the pressure sensor 100 shown in FIG. 1; this replaces the sensor member 920 of FIG. 1. The sensor member shown in FIGS. 8 and 9 could also be termed a sensor element or a force detection element. FIG. 9 shows a cross-sectional view of FIG. 8 along the line IX—IX. As shown in FIGS. 8 and 9, the sensor member 300a has a force transfer block (first block) 312, and a sensor block (second block) 302. The sensor block 302 is formed using an n-type silicon substrate. The sensor block 302 has a block member 303, and protruding members 305a–305c and 304 (see FIG. 8). The protruding members 305a–305c and 304 protrude from a top face (third face) of the sensor block 302.

The protruding members 305a and 305c have a rectangular parallelopiped shape. The protruding member 305b has a rectangular parallelopiped shape which is longer and thinner, when viewed from above, than the protruding members 305a and 305c. The protruding members 304 have a cylindrical column shape, and are four in number. The protruding members 305a–305c and 304 have the same height. These protruding members 305a–305c and 304 are formed in a patterned manner on a surface face of the n-type silicon substrate.

As shown in FIG. 9, p-type impurities are introduced to a portion of an upper portion of the protruding member 305a, forming a p-type region 320a. P-type impurities are introduced to upper portions of the protruding members 305b and 305c, forming p-type regions 320b and 320c. The p-type regions 320 (in particular the p-type region 320b) function as piezoresistive elements. When force is operated upon the piezoresistive elements, the resistance values thereof change.

N-type impurities are introduced to a portion of the upper portion of the protruding member 305a, forming a high-density n-type region 318. N-type regions 306a, 306b, and 306c are located in lower portions of the protruding members 305a, 305b and 305c respectively. The p-type regions 320a–320c and the adjoining n-type regions 306a–306c together form a p-n junction-separating structure. A current-bypassing electrode 308 is formed across the top of the p-type region 320a and the high-density n-type region 318 of the protruding member 305a. A repeater electrode 310 is formed on top of the p-type region 320c of the protruding member 305c. Furthermore, the p-type regions 320a–320c may be insulated from their surroundings by using, for example, a silicon oxide zone of an SOI substrate.

N-type impurities are introduced to a base face (fourth face) of the sensor block 302, forming a high-density n-type region 316. A second terminal 314 is attached to the base face (fourth face) of the sensor block 302. This second terminal 314 adjoins the high-density n-type region 316. The second terminal 314 is electrically connected with one end of the piezoresistive element 320b. Moreover, an upper face (a surface face of the protruding member 305) of the sensor block 302 has a region covered by an insulating film (not shown; a silicon oxide film, or the like). In this manner, the piezoresistive element preferably has a region covered by insulating material.

Glass containing floating ions is used to form the force transfer block 312. As shown in FIG. 8, the cylindrical column-shaped protruding members 304 support a base face (second face) of the force transfer block 312, each of the protruding members 304 being located in the vicinity of one of the four corners of the base face. Furthermore, a central portion of the base face (second face) of the force transfer block 312 is supported by the long and thin protruding member 305b and the protruding members 305a and 305c. The force transfer block 312 has an anode junction with the protruding members 304 and 305a–305c, and is fixed firmly thereto.

The force transfer block 312 is a hexahedron. A side face 312a thereof is an inclined face at an obtuse angle with respect to the top face (the third face) of the sensor block 302. A metal film 322 is deposited from the top of a top face (first face) of the force transfer block 312, along the top of the inclined face 312a, to the top of the protruding member 305c. This metal film 322 may be formed from, for example, aluminum or copper. The metal film 322c formed on top of the protruding member 305c makes contact with the repeater electrode 310.

The metal film 322a formed on top of the top face of the force transfer block 312 functions as a first electrode. In the present embodiment, the first electrode 322a is connected electrically with an end of the piezoresistive element 320b via the metal film 322b, 322c, and the repeater electrode 310. Further, FIG. 8 shows the sensor member 300a in a state where the metal film 322 is not formed thereon.

Figure 10:
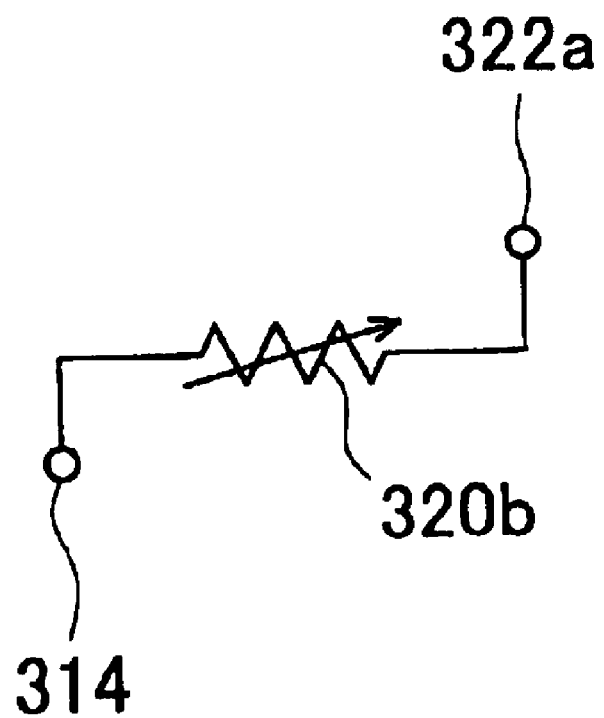
FIG. 10 shows an example of a single gauge electric circuit.

As FIG. 10 shows schematically, the first electrode 322a is electrically connected with one end of the piezoresistive element 320b (the p-type region). The second electrode 314 is electrically connected with the other end of the piezoresistive element 320b (the p-type region). In this manner, in the present embodiment, the piezoresistive element forms a single gauge electric circuit. However, single gauge electric circuits are not restricted to cases having only one piezoresistive element. Cases having a plurality of piezoresistive elements may at times be considered equivalent to a single gauge electric circuit. For example, a configuration considered equivalent to a single gauge electric circuit is one where one end of each piezoresistive element is connected to one common first electrode, and the other end of each piezoresistive element is connected to one common second electrode.

In order to insert the sensor member 300a shown in FIG. 9 into the pressure sensor 100 shown in FIG. 1, the first electrode 322a of the sensor member 300a in FIG. 9 makes face-to-face contact with the plate-shaped member 112a of the first terminal 112 in FIG. 1. Further, the second terminal 314 of the sensor member 300a in FIG. 9 makes face-to-face contact with the anterior end face of the second terminal 120 in FIG. 1.

Next, the operation of the sensor member 300a of the third embodiment will be described. Assume, for example, a current supply connecting the first terminal 112 and the second terminal 120 shown in FIG. 1. From this current supply, a constant current flows from the second terminal 120 towards the first terminal 112. That is, the current flows in the direction of the arrow with the dotted line shown in FIG. 9. In other words, the current passes through: the second electrode 314, the high-density n-type region 316, an n-type region of the sensor block member 303, the n-type region 306a of the protruding member 305a, the high-density n-type region 318, the current-bypassing electrode 308, the p-type regions 320a and 320b (the piezoresistive elements) and 320c, and the repeater electrode 310, reaching the metal film 322 (the first electrode). Then the current flows into the first terminal 112 shown in FIG. 1.

At this juncture, the voltage between the first terminal 112 and the second terminal 120 (shown in FIG. 1) can be measured by a voltmeter. This is the voltage when a constant current is flowing into the piezoresistive element 320b. Consequently, the voltage is essentially proportional to the resistance of the piezoresistive element 320b. As a result, by measuring the voltage, the magnitude of change in the resistance of the piezoresistive element 320b can be monitored. From the magnitude of change in the resistance, the magnitude of compressive stress operated on the piezoresistive element 320b can be monitored. From this magnitude of compressive stress, the magnitude of pressure operated upon the anterior end face (the force-receiving face) of the diaphragm 104a shown in FIG. 1 can be monitored.

Fourth Representative Embodiment

Figure 11:
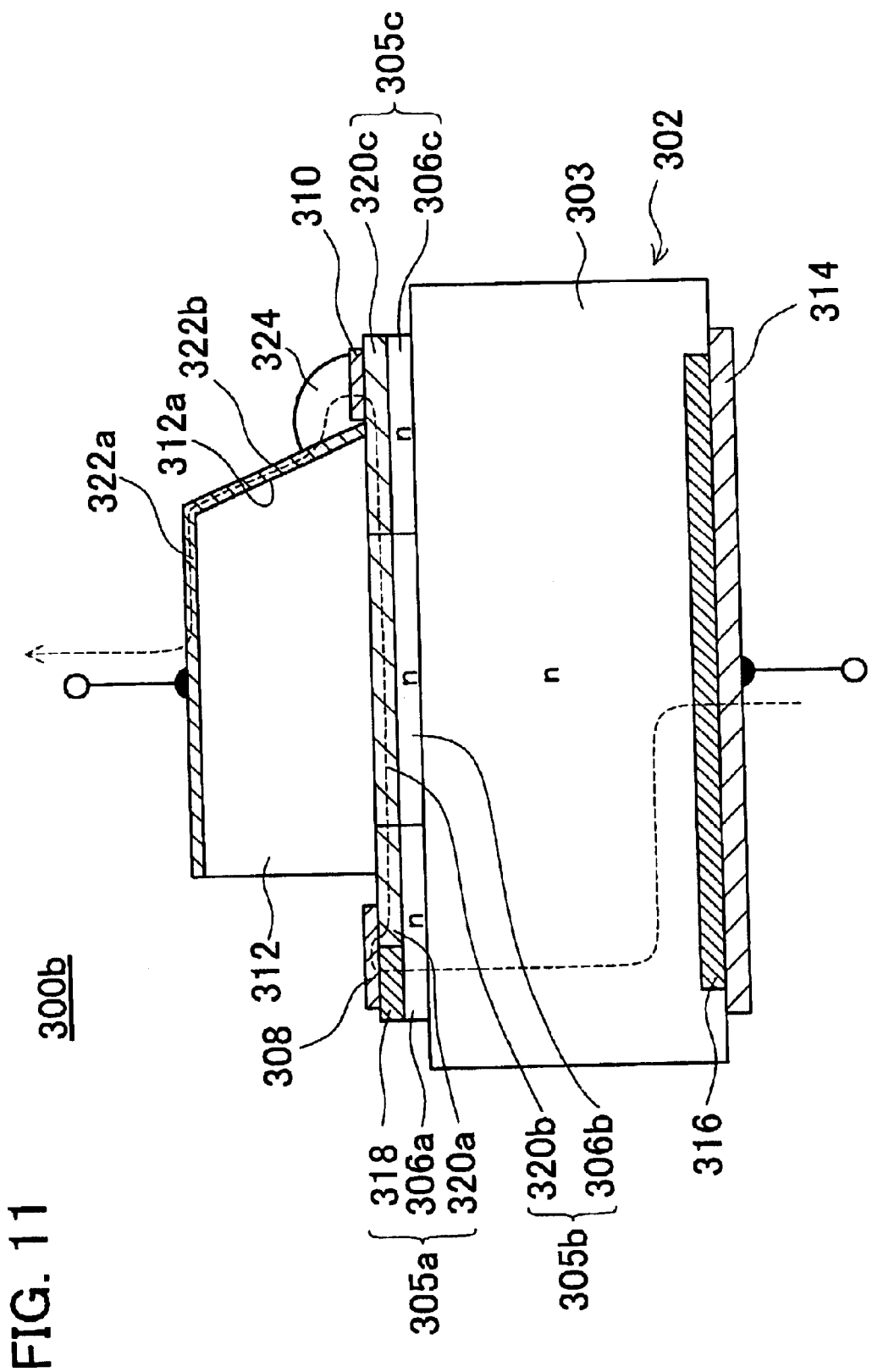
FIG. 11 shows a cross-sectional view, equivalent to a cross-section along the line IX—IX of FIG. 8, of a sensor member of a fourth embodiment.

In the fourth embodiment a sensor member 300b, shown in FIG. 11, is incorporated into the pressure sensor 100 shown in FIG. 1, this replacing the sensor member 920 of FIG. 1. In the sensor member 300a of the third embodiment, shown in FIG. 9, the metal film 322 is deposited as far as a position whereby it covers the repeater electrode 310. Furthermore, the repeater electrode 310 and the metal film 322 make direct electrical contact. By contrast, in the sensor member 300b of the fourth embodiment, shown in FIG. 11, the metal film 322b and the repeater electrode 310 make electrical contact via a soldered member 324. Conductive adhesive etc. may also be used in place of this soldered member 324.

Fifth Representative Embodiment

Figure 12:
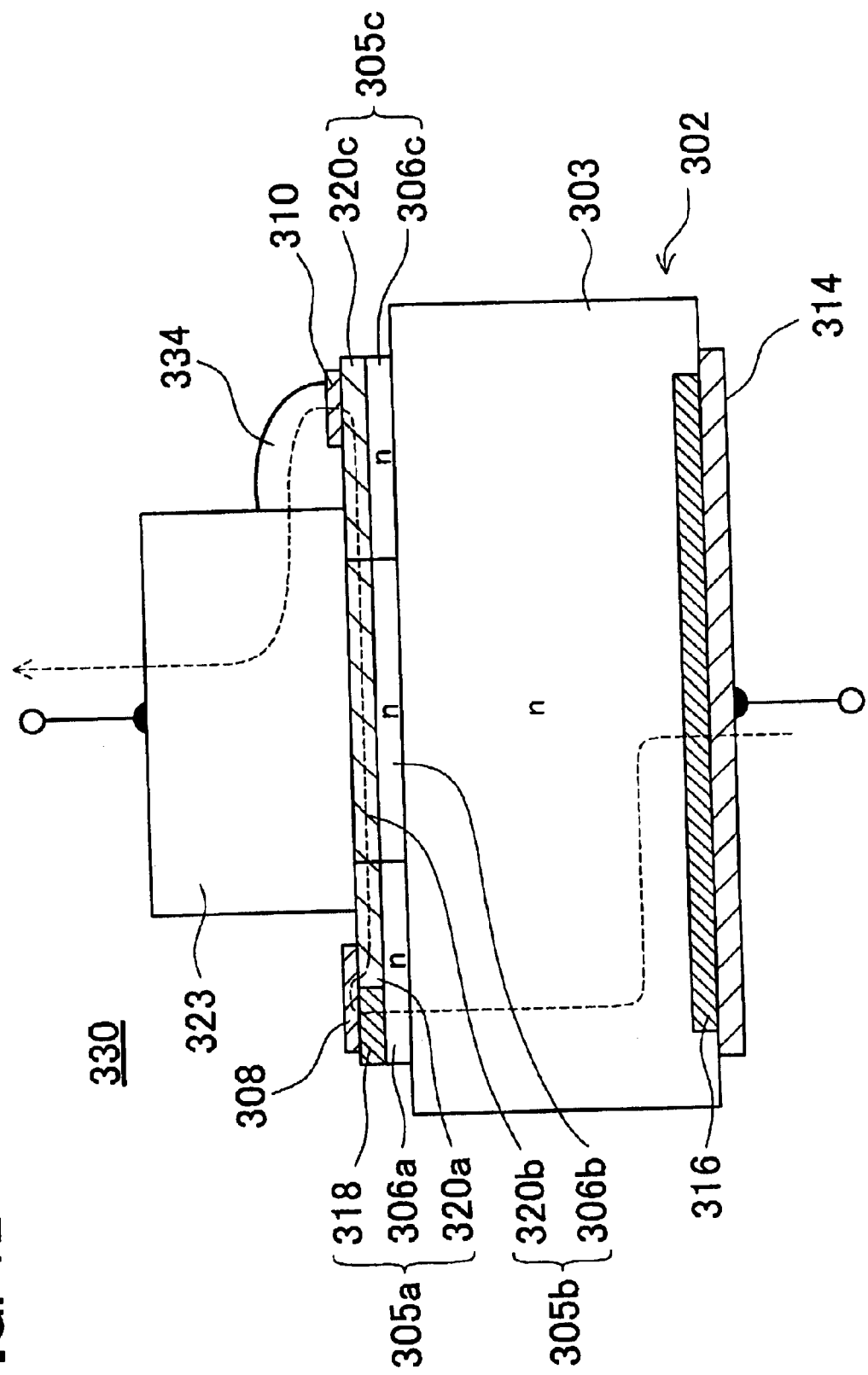
FIG. 12 shows a cross-sectional view of a sensor member of a fifth embodiment.

In the fifth embodiment, a sensor member 330, shown in FIG. 12, is incorporated into the pressure sensor 100 shown in FIG. 1, this replacing the sensor member 920 of FIG. 1. In the sensor member 330 shown in FIG. 12, a force transfer block 323 is formed from conductive material. This conductive material may be various metals, silicon having impurities introduced therein, etc. The force transfer block 323 and the repeater electrode 310 make electrical contact via a soldered member 334.

In the fifth embodiment, the force transfer block 323 essentially functions like a first electrode. A current path can be formed within the force transfer block 323. Further, the process of forming a conductive material (such as a metal film) along a surface face of the force transfer block 323 is omitted. Consequently, the manufacture process of the sensor is simpler. Further, (not shown) an insulating film (a silicon oxide film, etc.) covers the surface face of the sensor block 302, which makes contact with the force transfer block 323. In such a case that the repeater electrode 310 is large (such as the repeater electrode 310 covering the protruding member 305b) so that the force transfer block 323 and the repeater electrode 310 overlap, it is possible to make the force transfer block 323 contact the repeater electrode 310. In this case, a soldered member 334 is unnecessary.

Sixth Representative Embodiment

Figure 13:
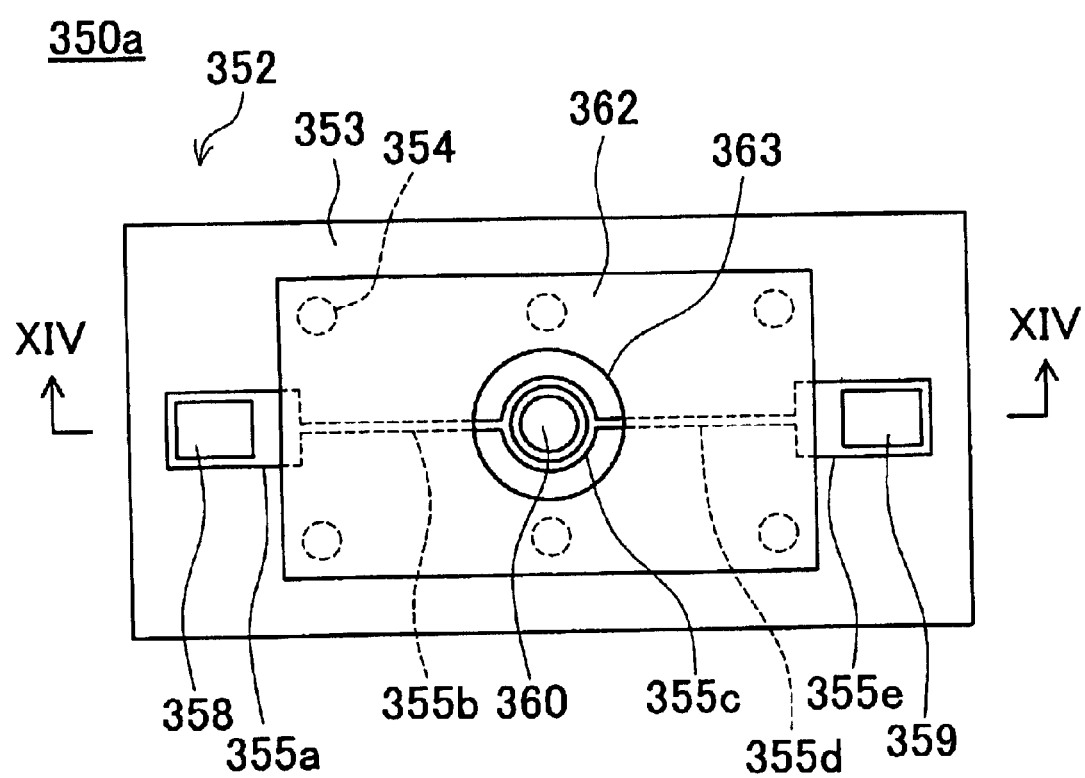
FIG. 13 shows a plan view of a sensor member of a sixth embodiment.
Figure 14:
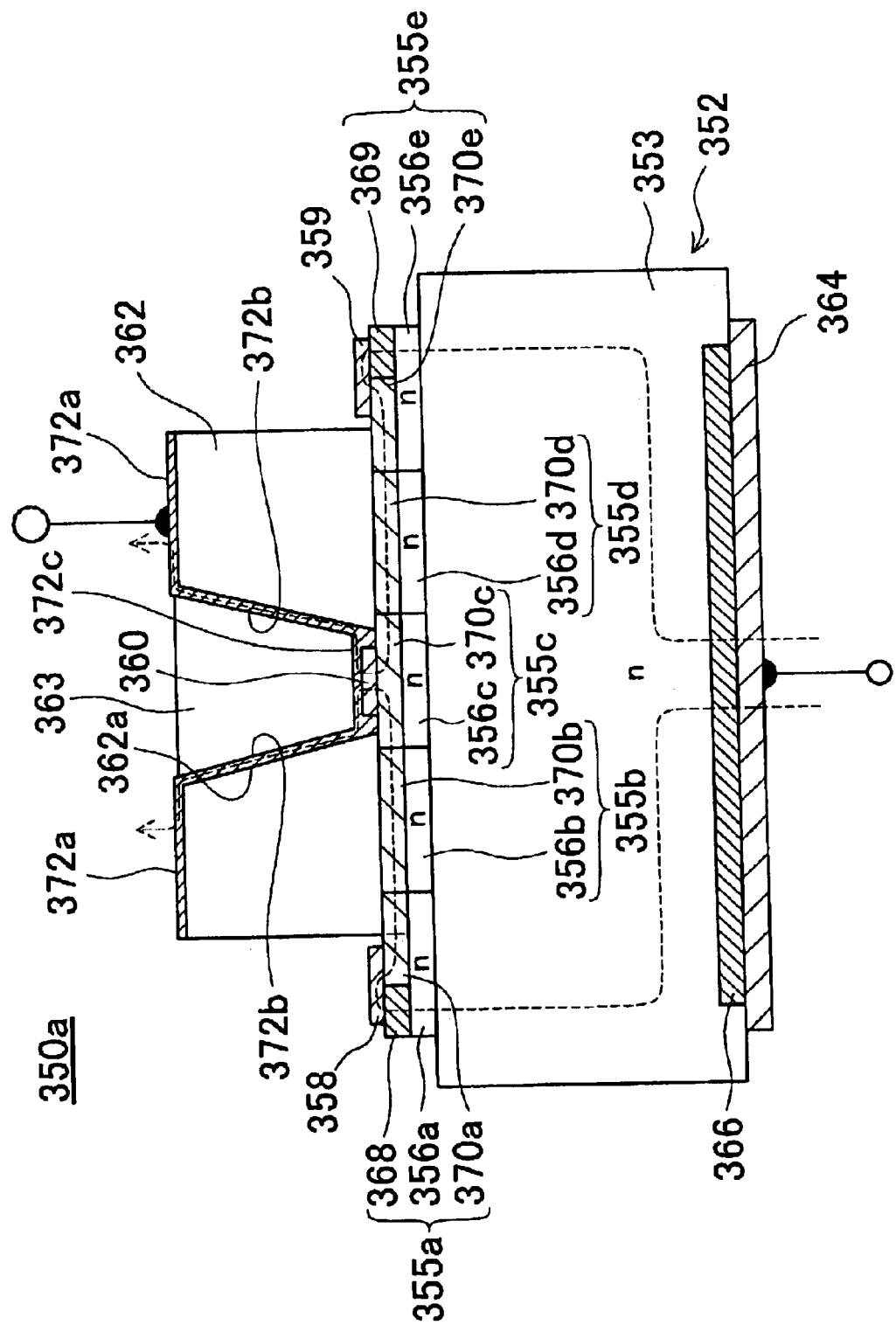
FIG. 14 shows a cross-sectional view of FIG. 13 along the line XIV—XIV.

In the sixth embodiment, a sensor member 350a, shown in FIGS. 13 and 14, is incorporated into the pressure sensor 100 shown in FIG. 1, this replacing the sensor member 920 of FIG. 1. FIG. 14 shows a cross-sectional view of FIG. 13 along the line XIV—XIV. As shown in FIGS. 13 and 14, the sensor member 350a of the sixth embodiment appears as if two of the sensor members 300a of the third embodiment shown in FIGS. 8 and 9 have coalesced. The structure of a left half or a right half of the sensor member 350a of the sixth embodiment resembles the structure of the sensor member 300a of the third embodiment. A description will be given below focusing on distinctive features of the sensor member 350a of the sixth embodiment.

The sensor member 350a has a sensor block 352 and a force transfer block 362. The sensor block 352 has protruding members 355a–355e and 354 (see FIG. 13). The long and thin protruding members 355b and 355d extend in the left-right direction, relative to FIGS. 13 and 14, from a cylindrical column-shaped protruding member 355c. The rectangular parallelopiped-shaped protruding member 355a is joined with a left end of the protruding member 355b. The rectangular parallelopiped-shaped protruding member 355e is joined with a right end of the protruding member 355d. As shown in FIG. 13, the cylindrical column-shaped protruding members 354 are six in number. The left half and right half of the sensor member 350a are symmetrical.

As shown in FIG. 13, outer side portions of the force transfer block 362 are supported by the six cylindrical column-shaped protruding members 354. A central portion of the force transfer block 362 is supported by the long and thin protruding members 355b and 355d, and by the protruding members 355a and 355e. As shown in FIGS. 13 and 14, a tapered cavity member 363 is formed in a center portion of the force transfer block 362. A side face 362a (see FIG. 14) of the cavity member 363 of the force transfer block 362 is an inclined face formed at an obtuse angle with respect to a top face of the sensor block 352. A first electrode 372a is electrically connected with one end of each of two piezoresistive elements (p-type regions) 370b and 370d. A second electrode 364 is electrically connected with the other end of the two piezoresistive elements (p-type regions) 370b and 370d. In the present embodiment, the piezoresistive elements are equivalent to a single gauge configuration.

Next, the operation of the sensor member 350a of the sixth embodiment will be described. As in the third embodiment, a constant current flows from the second terminal 120 towards the first terminal 112 shown in FIG. 1. That is, the current flows in the direction of the two arrows with the dotted lines shown in FIG. 14. In other words, the current branches within the sensor member 350a. As shown by the arrow on the left side of FIG. 14, the first branch of this current passes through the piezoresistive element (p-type region) 370b, etc., reaching the metal film 372 (the first electrode). As shown by the arrow on the right side of FIG. 14, the second branch of this current passes through the piezoresistive element (p-type region) 370d, etc., reaching the metal film 372 (the first electrode). The remaining operation is fundamentally identical with that of the third embodiment.

Seventh Representative Embodiment

Figure 15:
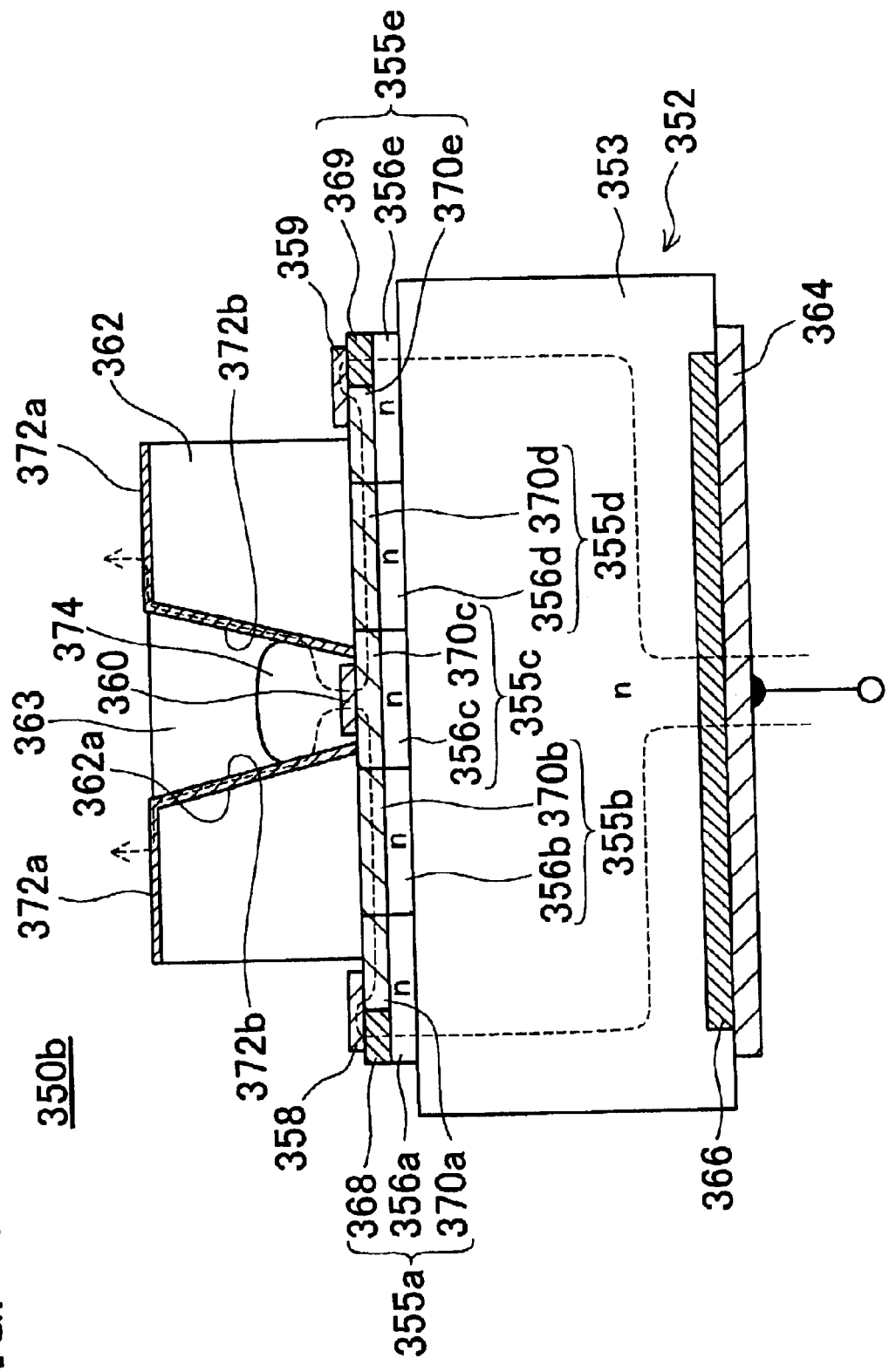
FIG. 15 shows a cross-sectional view, equivalent to a cross-section along the line XIV—XIV of FIG. 13, of a sensor member of a seventh embodiment.

In the seventh embodiment, a sensor member 350b, shown in FIG. 15, is incorporated into the pressure sensor 100 shown in FIG. 1, this replacing the sensor member 920 of FIG. 1. In the sensor member 350a of the sixth embodiment, shown in FIG. 14, a metal film 372 is deposited as far as a position whereby it covers a repeater electrode 360. Furthermore, the repeater electrode 360 and the metal film 372 make direct electrical contact. By contrast, in the sensor member 350b of the seventh embodiment, shown in FIG. 15, the metal film 372b and the repeater electrode 360 make electrical contact via a soldered member 374.

Eighth Representative Embodiment

Figure 16:
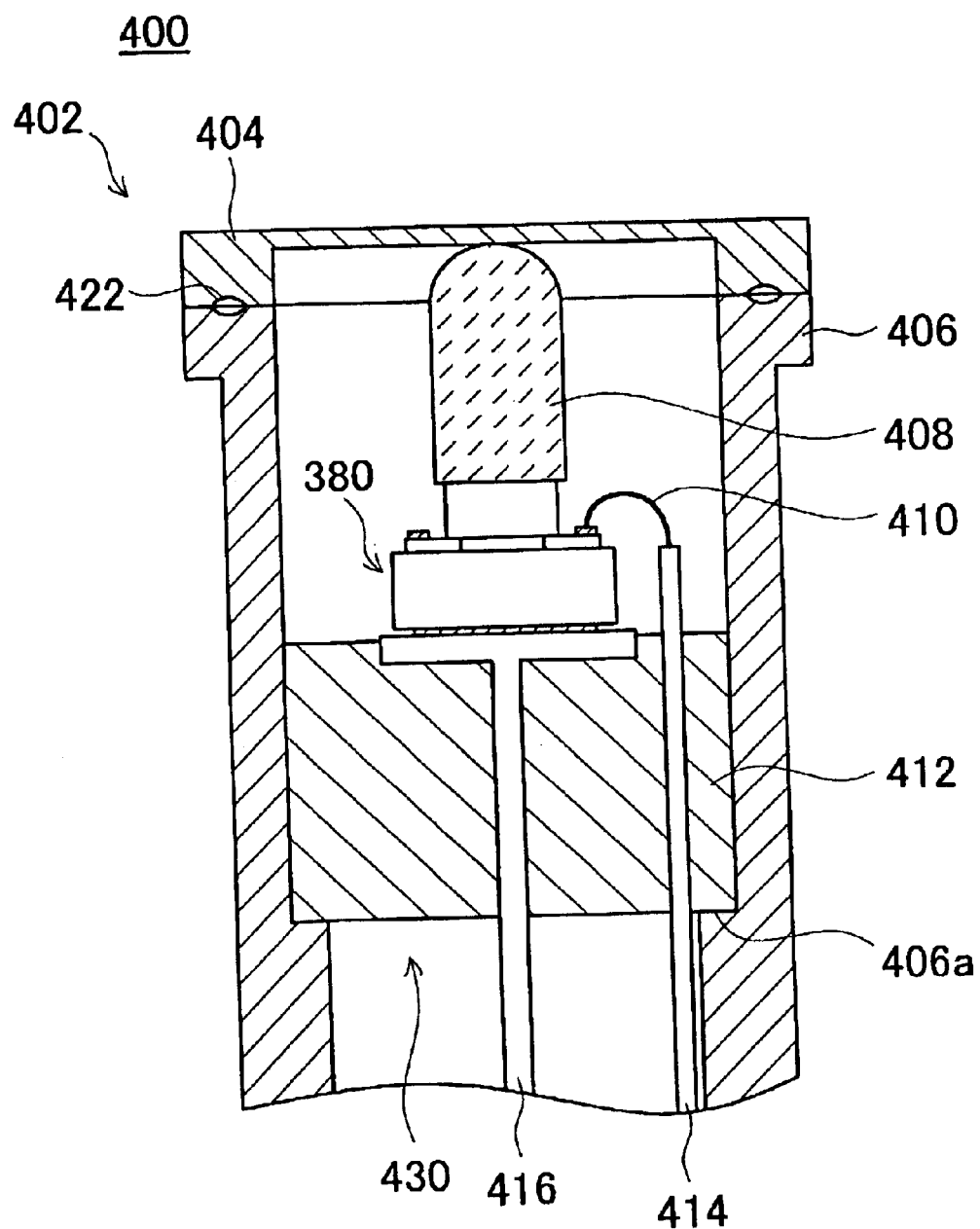
FIG. 16 shows a cross-sectional view of a pressure sensor of an eighth embodiment.
Figure 17:
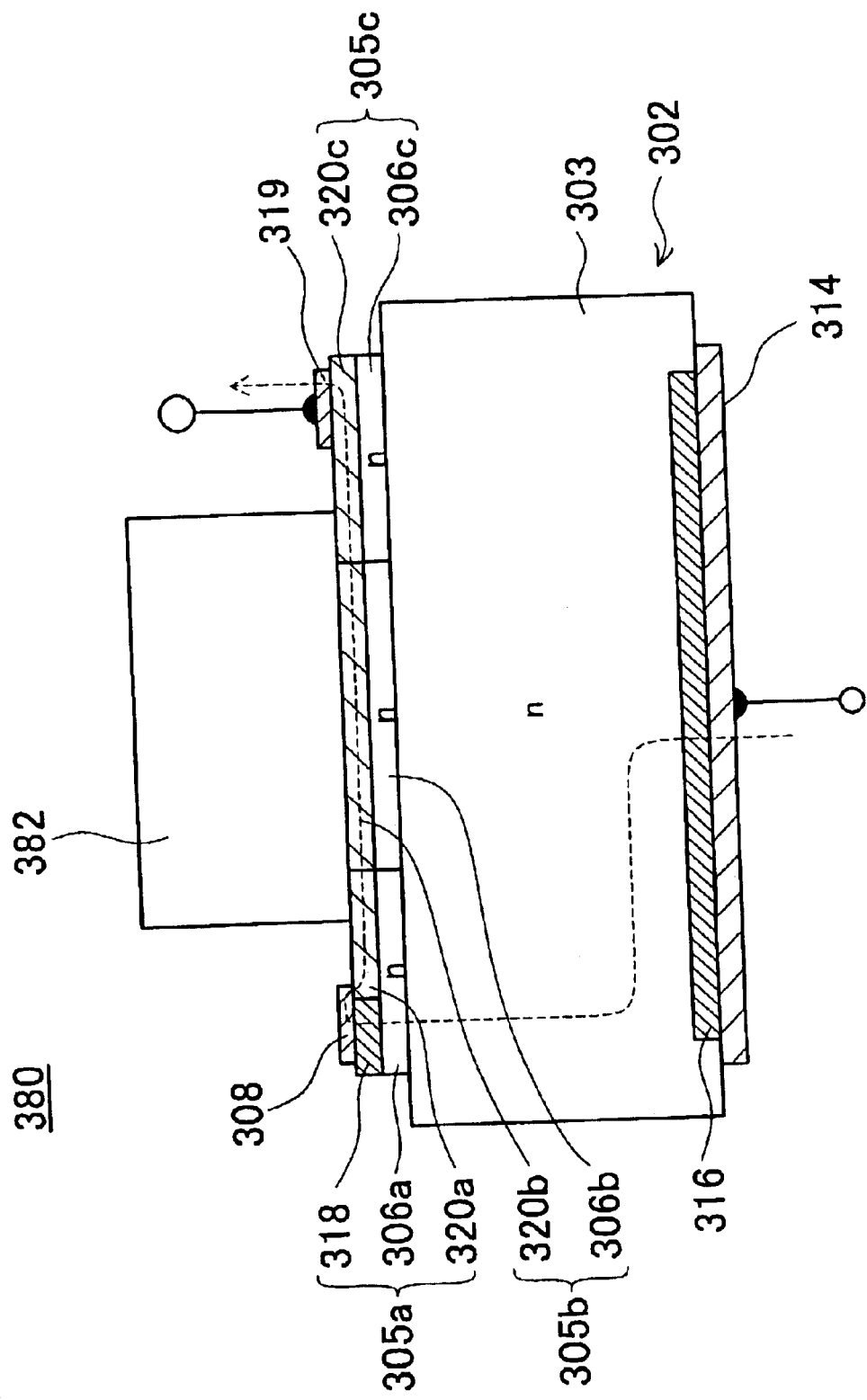
FIG. 17 shows a cross-sectional view of a sensor member of the pressure sensor of the eighth embodiment.

FIG. 16 shows a cross-sectional view of a pressure sensor 400 of an eighth embodiment. FIG. 17 shows a cross-sectional view of a sensor member 380 of the pressure sensor 400 of the eighth embodiment. The pressure sensor 400 of the eighth embodiment has a housing 402, a force transfer member 408, and a sensor unit 430. The housing 402 has a housing anterior end member 404 and a housing cylindrical member 406. The housing anterior end member 404 and the housing cylindrical member 406 are welded together at a welding location 422. The sensor unit 430 has a sensor member 380, a supporting base 412, a first terminal 414, and a second terminal 416. The first terminal 414 and the second terminal 416 are buried in the supporting base 412. The supporting base 412 is press-fitted into the housing cylindrical member 406. Furthermore, the supporting base 412 connects with a stepped member 406a. By this means, the supporting base 412 and the sensor unit 430 are fixed firmly to the housing 402.

The sensor member 380 of the eighth embodiment shown in FIG. 17 has a structure differing from that of the sensor member 300a of the third embodiment shown in FIG. 9. Specifically, in the sensor member 300a of the third embodiment, a metal film is deposited on the top face and side face of the force transfer block 312. By contrast, no metal film is deposited on a force transfer block 382 of the eighth embodiment. In the sensor member 380, the electrode 319 is not a repeater electrode like that of the sensor member 300a of the third embodiment; instead it functions as a first electrode. The first electrode 319 is connected with the first terminal 414 via a wire 410. In the eighth embodiment, a disc-shaped member is formed on an upper end portion of the second terminal 416 shown in FIG. 16. The second electrode 314 (see FIG. 17) of the sensor member 380 connects face-to-face with an upper face of the disc-shaped member of the second terminal 416. Thus, within the sensor member 380, the current that has reached the first electrode 319 passes along the wire 410 to reach the first terminal 414.

The embodiments described above merely illustrate some possibilities of the invention. For example, the shape of the structural body having piezoresistive elements is not restricted. The structural body may equally well be one single block, or may have three or more blocks. The structural body may be plate shaped or bar shaped. The piezoresistive elements may be formed within the block. The entire block may form a piezoresistive element. The piezoresistive elements need not protrude.

Figure 18:
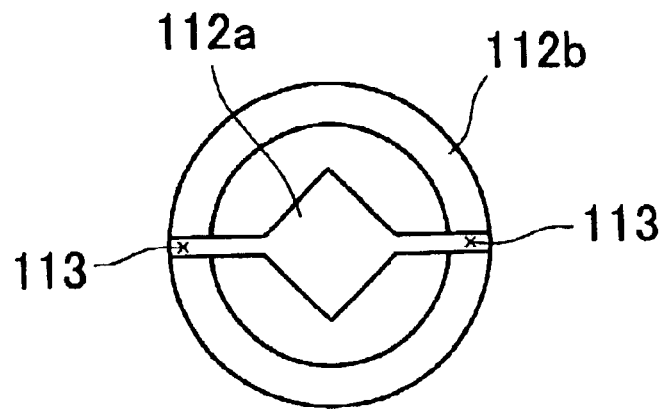
FIG. 18 shows a first configuration of a first terminal, viewed from an anterior end towards a posterior end thereof.
Figure 19:
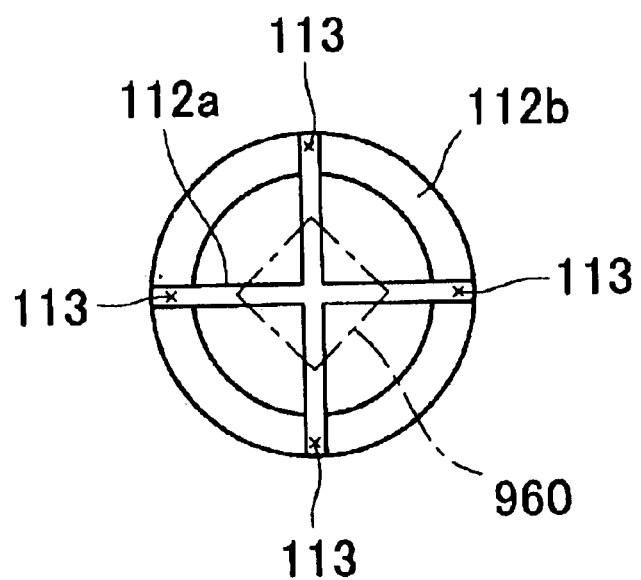
FIG. 19 shows a second configuration of the first terminal, viewed from the anterior end towards the posterior end thereof.

The shape of the plate-shaped member 112a shown in FIG. 1 is not restricted to a disc shape. The plate-shaped member may be shaped, for example, as shown in FIG. 18. FIG. 18 shows a configuration of the plate-shaped member 112a and the cylindrical member 112b of the first terminal 112, viewed from an anterior end towards a posterior end. The plate-shaped member 112a of the first terminal 112 has a rectangular member and two long and thin members. The two long and thin members extend outwards from two diagonally opposite corners of the rectangular member. Ends of the two long and thin members are welded to the cylindrical member 112b at welding locations 113. Alternatively, the plate-shaped member 112a may be formed in a cross shape, as shown in FIG. 19. Four ends of this cross-shaped plate-shaped member 112a may be welded to the cylindrical member 112b at the welding locations 113.

The plate-shaped member 112a of the first terminal 112 of the first embodiment (see FIG. 1) may be replaced by an equivalent component that is not plate shaped. For example, it may be right-angled parallelopiped in shape. The cylindrical member 112b shown in FIG. 1 need not be present. In that case as well, the plate-shaped member 112a can be earthed. In an example of earthing the plate-shaped member 112a, the outer circumference portion of the plate-shaped member 112a may be connected to the housing 102 or the force transfer member 108.

The space between the second terminal 120 and the first terminal 112 of FIG. 1 may be sealed or fixed by insulating material other than the glass solder 116. The connection between the first terminal 112 and the first electrode 960 of FIG. 1 may be face-to face, along a line or at a point. The type of connection is not restricted. The same applies for the connection between the second terminal 120 and the second electrode 962. The electric circuit formed within the electric circuit block 940 is not restricted to that shown in FIG. 6. For example, a configuration without the operational amplifier 980 or the transistor 982 is also possible.

What is claimed is:

1. A force sensor comprising:
   a housing;
   a first block provided within the housing, the first block having a first face and a second face, and a force to be measured by the force sensor being applied on the first face of the first block;
   a second block provided within the housing, the second block having a third face and a fourth face, and the third face of the second block making contact with the second face of the first block;
   at least one piezoresistive element formed on one of the second face of the first block and the third face of the second block, resistance value of the piezoresistive element changing as contacting pressure between the first block and the second block changes;
   a first electrode formed on a face of the first block or the second block other than the fourth face of the second block; and
   a second electrode formed on the fourth face of the second block;
   wherein electrical characteristics between the first electrode and the second electrode changes in accordance with changes in the contacting pressure between the first block and the second block.

2. The sensor as in claim 1, further comprising:
   a first terminal connected with the first electrode, the first terminal extending to outside the force sensor; and
   a second terminal connected with the second electrode, the second terminal extending to outside the force sensor.

3. The sensor as in claim 2, wherein
   the first electrode and the first terminal and/or the second electrode and the second terminal are directly connected without wire.

4. The sensor as in claim 2, wherein
   the first electrode and the first terminal and/or the second electrode and the second terminal are connected by face-to-face contact.

5. The sensor as in claim 1, further comprising:
   a force transfer member for transferring the force to be measured to the first face of the first block.

6. The sensor as in claim 5, further comprising:
   an external-force receiving member for receiving the force to be measured and making contact with the force transfer member.

7. The sensor as in claim 5, further comprising:
   a first terminal connected with the first electrode, the first terminal having a first member located between the force transfer member and the first face of the first block, and the first member being movable in accordance with the movement of the force transfer member.

8. The sensor as in claim 7, wherein
   the first terminal has a second member located within the housing, the second member being a cylindrical shape extending approximately in parallel to an axial direction of the housing, and
   the first member is connected, in a manner allowing movement, to an end of the second member.

9. The sensor as in claim 1, further comprising:
   a second terminal connected with the second electrode, the second terminal extending in a bar shape, and an end face of a bar-shaped member making face-to-face contact with the second electrode.

10. The sensor as in claim 9, wherein
    a space between a bar-shaped member of the second terminal and the housing is sealed.

11. The sensor as in claim 1, wherein
    the first block and the second block are joined by an anode junction.

12. The sensor as in claim 1, wherein
    the piezoresistive element is formed on the second face of the first block; and the second block is made of a semiconductor block, an electric circuit being formed within the semiconductor block.

13. The sensor as in claim 1, wherein
    one end of the piezoresistive element is connected to the first electrode; and another end of the piezoresistive element is connected to the second electrode.

14. The sensor as in claim 1, wherein
    a conductive layer is formed on a portion of a surface face of the first block.

15. The sensor as in claim 1, wherein
    the piezoresistive element is provided on the third face of the second block, the second block being made of a semiconductor block, and the piezoresistive element and regions surrounding the piezoresistive element being isolated by a p-n junction.

16. A force sensor comprising:
    a first block having a first face and a second face, a force to be measured by the force sensor being applied on the first face of the first block;
    a second block having a third face and a fourth face, the third face of the second block making contact with the second face of the first block;
    at least one piezoresistive element formed on one of the second face of the first block and the third face of the second block, resistance value of the piezoresistive element changing in accordance with changes of contacting pressure between the first block and the second block;
    a first electrode formed on a face of the first block or the second block other than the fourth face of the second block, one end of the piezoresistive element being connected to the first electrode;
    a second electrode formed on the fourth face of the second block, another end of the piezoresistive element being connected to the second electrode;

whereby resistance between the first electrode and the second electrode changes in accordance with changes in the contacting pressure between the first block and the second block.

17. A force sensor comprising:

a structural body having a first face and a second face;

a piezoresistive element within the structural body;

a first terminal connected with one end of the piezoresistive element via the first face;

a second terminal connected with the other end of the piezoresistive element via the second face;

a force transmitting member; and a housing enclosing the structural body and the force transmitting member, wherein the structural body is fixed to the housing, and the force transmitting member transmits a force to the structural body in accordance with a force applied to the force sensor, the structural body has an upper and lower faces, the first terminal has a cylindrical member enclosing the structural body and a plate-shaped member making face-to-face contact with the first face of the structural body, and the second terminal has an upper face, the upper face of the second terminal making face-to-face contact with the second face of the structural body.

18. The sensor as in claim 17, wherein the first terminal and the second terminal are fixed within the housing, and the first terminal and the second terminal are isolated from the housing.

19. The sensor as in claim 17, wherein the housing is electrically connected to the first terminal and isolated from the second terminal, and the second terminal is fixed within the housing.

* * * * *